United States Patent
Shimizu et al.

(10) Patent No.: US 8,900,687 B2
(45) Date of Patent: Dec. 2, 2014

(54) BIAXIALLY STRETCHED POLYAMIDE RESIN FILM

(75) Inventors: Toshiyuki Shimizu, Otsu (JP); Naofumi Kajita, Otsu (JP); Yasumasa Morimoto, Otsu (JP)

(73) Assignee: Toyobo Co., Ltd., Osaka (JP)

( * ) Notice: Subject to any disclaimer, the term of this patent is extended or adjusted under 35 U.S.C. 154(b) by 507 days.

(21) Appl. No.: 13/132,552

(22) PCT Filed: Dec. 1, 2009

(86) PCT No.: PCT/JP2009/070149
§ 371 (c)(1),
(2), (4) Date: Jun. 2, 2011

(87) PCT Pub. No.: WO2010/064616
PCT Pub. Date: Jun. 10, 2010

(65) Prior Publication Data

US 2011/0236635 A1    Sep. 29, 2011

(30) Foreign Application Priority Data

Dec. 3, 2008 (JP) ................. 2008-308394
Dec. 3, 2008 (JP) ................. 2008-308395
Dec. 3, 2008 (JP) ................. 2008-308396
Dec. 3, 2008 (JP) ................. 2008-308397
Dec. 3, 2008 (JP) ................. 2008-308398

(51) Int. Cl.
*B32B 3/00* (2006.01)
*C08J 5/18* (2006.01)
*B32B 27/20* (2006.01)
*B32B 27/08* (2006.01)
*B29C 55/14* (2006.01)
*B32B 27/34* (2006.01)
*B29C 55/02* (2006.01)
*B29K 77/00* (2006.01)

(52) U.S. Cl.
CPC ................. *B29C 55/143* (2013.01); *C08J 5/18* (2013.01); *B32B 27/20* (2013.01); *C08J 2377/00* (2013.01); *B32B 27/08* (2013.01); *B29K 2077/00* (2013.01); *B32B 27/34* (2013.01); *B29C 55/023* (2013.01)
USPC ........................................ 428/143; 428/141

(58) Field of Classification Search
USPC .................................................. 428/141, 143
See application file for complete search history.

(56) References Cited

U.S. PATENT DOCUMENTS

2008/0119633 A1    5/2008   Nishi et al.
2008/0254259 A1   10/2008   Nishi et al.
2010/0080985 A1*  4/2010   Noda et al. .................... 428/336

FOREIGN PATENT DOCUMENTS

EP    1 881 022 A1    1/2008
JP    9-194606 A       7/1997

(Continued)

OTHER PUBLICATIONS

Japanese to English machine translation for JP 09-194606 A. Jul. 29, 1997.*

(Continued)

*Primary Examiner* — Maria Veronica Ewald
*Assistant Examiner* — Nancy Johnson
(74) *Attorney, Agent, or Firm* — Leydig, Voit & Mayer, Ltd.

(57) ABSTRACT

Disclosed is a polyamide resin film which has excellent dimensional stability with respect to moisture absorption, excellent mechanical characteristics and sliding properties under high temperature and high humidity conditions, and excellent handling properties. Specifically disclosed is a biaxially stretched polyamide resin film, to which 0.3-10% by weight of an inorganic material including a layered compound is added. The biaxially stretched polyamide resin film is characterized in that the layered compound is in-plane oriented, and that the film has a haze of 1.0-20%, an elastic modulus in the longitudinal direction of 1.7-3.5 GPa at a relative humidity (RH) of 35%, a surface roughness (Sa) of 0.01-0.1 μm, and a coefficient of static friction (F/B) of 0.3-1.0 at a normal stress of 0.5 N/cm².

11 Claims, 1 Drawing Sheet

(56) References Cited

FOREIGN PATENT DOCUMENTS

| JP | 10-138332 | A | 5/1998 |
| JP | 11-199706 | A | 7/1999 |
| JP | 2003-020349 | A | 1/2003 |
| JP | 2003-313322 | A | 11/2003 |
| JP | 2006-088690 | A | 4/2006 |
| JP | 2006-096801 | A | 4/2006 |
| JP | 2007-196635 | A | 8/2007 |
| JP | 2007-237640 | A | 9/2007 |
| JP | 2008-290369 | A | 12/2008 |
| WO | WO 2008075461 | A1 * | 6/2008 |

OTHER PUBLICATIONS

Breil, J., "Oriented Film Technology," in *Multilayer Flexible Packaging* (J. R. Wagner, Jr.), p. 126 (2009).
"Honeywell Capran K Coated Nylon Film", retrieved from the Internet at URL: http://www/matweb.com/search/datasheet_print.aspx?matguid=5356a014fa7b491188f868c00741ff1a on Aug. 29, 2012.
European Patent Office, Extended European Search Report in European Patent Application No. 09830382.9-2307 (Sep. 14, 2012).
International Bureau of WIPO, International Preliminary Report on Patentability in International Patent Application No. PCT/JP2009/070149 (Jul. 5, 2011).
Japanese Patent Office, International Search Report in International Patent Application No. PCT/JP2009/070149 (Jan. 26, 2010).
Nishino, Takashi, "Nanoanalysis of Polymer Surface/Interface and Development Toward Hybridgs," *Proceedings of 174th Committee on Molecular Nanotechnology*, pp. 22-23 (Jul. 13, 2007).
S.B. Research Co., Ltd. (formerly Sumitomo Bakelite-Tsutsunaka Techno Co., Ltd.), Advanced Polymeric Nanocomposite, pp. 43-47 (Nov. 2003).
Taiwanese Patent Office, Notification for the Opinion of Examination in Taiwanese Patent Application No. 098141148 (Mar. 25, 2014).
Japanese Patent Office, Notice of Reasons for Rejection in Japanese Patent Application No. 2008-308394 (Jul. 1, 2014).
Japanese Patent Office, Notice of Reasons for Rejection in Japanese Patent Application No. 2008-308396 (Jul. 1, 2014).
Japanese Patent Office, Notice of Reasons for Rejection in Japanese Patent Application No. 2008-308397 (Jul. 1, 2014).
Japanese Patent Office, Notice of Reasons for Rejection in Japanese Patent Application No. 2008-308398 (Jul. 1, 2014).

* cited by examiner

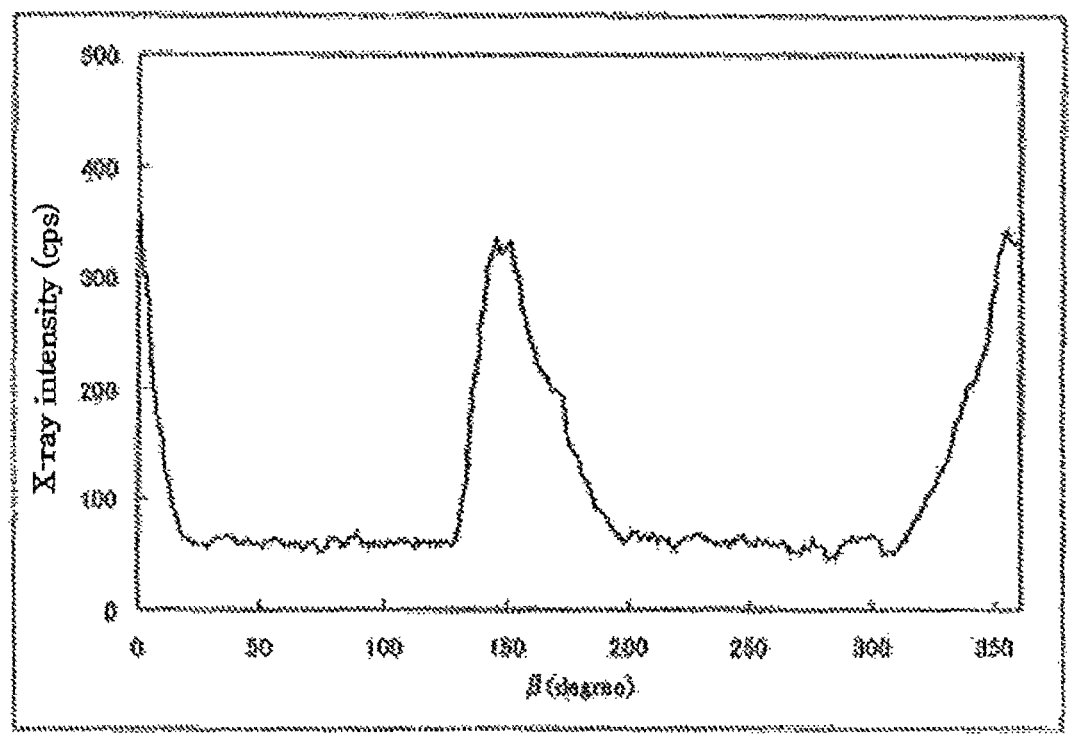

BIAXIALLY STRETCHED POLYAMIDE RESIN FILM

TECHNICAL FIELD

The first invention relates to a film of a resin containing a layered compound commonly called as a nano-composite. More particularly, the invention relates to a stretched film of a nano-composite polyamide resin of which stretching at a high ratio has conventionally been said to be impossible with an addition amount of 1% or more of the layered compound.

A conventional nylon film is made slidable by roughening the surface in the case the slipping property is needed under high humidity, since the slipping property is changed in accordance with humidity. However, in the case of a film containing an inorganic layered compound, the alteration of the slipping property relative to humidity is small. In addition, even if the surface roughness is small, a sufficient slipping property can be exhibited and therefore contradictory characteristics such as gloss can be satisfied simultaneously.

The second invention relates to a biaxially stretched multilayer polyamide resin film laminated with an olefin resin film such as polyethylene, polypropylene, or the like. The resulting multilayer film is preferably used for wrapping retort food products, since the laminate film is tough and has excellent pinhole resistance. More particularly, the invention relates to a biaxially stretched multilayer polyamide resin film with little boiling strain in the entire width of a film roll in the case of using the resin film as a wrapping material.

The shrinkage stress of a biaxially stretched polyamide resin film can be lowered by providing the above-mentioned multilayer structure to the second invention and as a result, strain caused by bowing at the time of boiling can be suppressed. Further, in the case a layered compound is simultaneously added, the gas barrier property can be improved and the boiling strain can be concurrently lessened.

BACKGROUND OF THE INVENTION

A biaxially stretched polyamide resin film is excellent in the mechanical characteristics, barrier property, pinhole resistance, transparency, etc. and has been used widely as a wrapping material. However, due to a high hygroscopic property derived from amide bonds in the polymer structure, the mechanical strength can fluctuate, and hygroscopic elongation occurs in accordance with fluctuation in humidity and besides, problems tend to occur in many kinds of steps. Furthermore, the glass transition temperature of the resin itself is not so high and improvement of heat resistance, particularly, the mechanical properties at a high temperature, has been desired.

Moreover, a common polyamide film made of nylon 6 has a high elastic modulus but low elongation, and accordingly shows a lowered maximum point stress and rather brittle characteristics in a low humidity. On the other hand, the polyamide film has a low elastic modulus but high elongation, and accordingly shows an increased maximum point stress and ductility in a high humidity. When modifying the stretching conditions for improving the characteristics in lower humidity, there occurs a problem that the film characteristics are unbalanced. As described, a common polyamide film shows considerably changed characteristics in accordance with the humidity level as compared with a film comprising a poly(ethylene terephthalate). Therefore, it is necessary to control the humidity in the film production process and to determine the processing conditions on the basis of previous estimation of characteristic fluctuation.

Further, a biaxially stretched polyamide resin film shows a decrease of the mechanical strength and hygroscopic elongation due to the high hygroscopic property derived from amide bonds in the polymer structure. In addition, the difference of shrinkage quantities at the time of boiling the polyamide film tends to cause problems in many steps due to strains and curls formed in the film.

The strains at the time of humidity absorption and boiling are generated due to relaxation of the structure at the time of stretching. When a material with a high stretching stress is stretched, the shrinkage stress generated at the time of relaxation becomes high and the strain also becomes significant. Therefore, it is supposed to be possible that the strain or the like can be suppressed by lowering the shrinkage stress; however in the case of a polyamide resin, it becomes difficult to change the stretching stress due to the strong hydrogen bonds between molecules and thus it is difficult to lower the stretching stress. Some of previous documents disclose decrease of boiling strains; however there is no technique disclosed for lowering the stress (Reference to Patent Documents 1 to 3).

Patent Document 1: Japanese Patent Application Laid-Open (JP-A) No. 2006-96801
Patent Document 2: JP-A No. 2006-88690
Patent Document 3: JP-A No. 2007-237640

As described above, with respect to a polyamide resin film with lowered boiling strains, there is no investigation on lowering the boiling strains, while paying attention to the stretching stress.

Further, it has been known as a method for improving heat resistance and the hygroscopic property of a polyamide resin that a layered silicate can be evenly dispersed. This technique has been known well as nano-composite formation. Since the above-mentioned various characteristics can be improved by the nano-composite formation, it is expected that a film with improved characteristics can be obtained by film formation. However, in reality, the resin is generally poor in the stretching property and unsuitable as a resin for stretched films. Particularly, it is said that in order to sufficiently improve the mechanical properties, addition of 1% or more of a layered silicate to the polyamide resin is needed; however the stretching of a polyamide resin with a high layered silicate content is considerably difficult.

Patent Document 4 discloses a biaxially stretched polyamide film containing a layered silicate. The highest reaching temperature for the successive stretching in the width direction followed by the longitudinal direction for overcoming the difficulty of stretching is as high as 180 to 200° C. Not only difficulty of production, but also difficulty of crystallization, is promoted too far before sufficient stretching in the width direction is performed. As a result, there occur problems such that the layered silicate cannot be sufficiently oriented, various effects due to the addition of the layered silicate are not exhibited, thickness unevenness occurs in fine regions, and pinhole resistance cannot be satisfied.

Patent Document 4: JP-A No. 2003-20349

Further, as being understood from the scopes of claims of the specified methods described above, practically the amount of a layered compound is 1 wt. % or lower (including the organic matter contained in the interlayer). If the amount of layered compound exceeds 1 wt. %, whitening at the time of stretching and poor productivity at the time of high stretching ratio occur. These drawbacks are supposedly attributed to that the stress that tends to be converged on the tip end of the layered compound at the time of stretching such that creases and cracks are easily caused.

Further, Patent Document 5 discloses a stretched film in a system containing 0.5 to 5% of a layered inorganic compound but does not describe any concrete countermeasure for solving the above-mentioned poor stretching property nor discloses any technique for a stretching method with industrial productivity by successive biaxial stretching in a system containing a layered compound in a high concentration of 1% or higher and consequently, results in investigation in a level of simultaneous biaxial stretching of small specimens in a laboratory. Also, there is a description in the specification that a layered inorganic compound such as montmorillonite has an effect on improvement of the slipping property due to decreasing water absorption. However, an equilibrium moisture content of a resin is increased if a material such as montmorillonite is added to a nylon resin. Based on this, it can be said that the essence of the invention is significantly attributed to the effect of the addition of the inorganic lubricant.

Patent Document 5: JP-A 2003-313322

On the other hand, Nishino et al, Kobe University pointed out an interesting result with respect to evaluation of the orientation of a layered inorganic compound dispersed in a stretched film (e.g., Non-patent Document 1). In this report, they paid attention to 060 reflection in a layer of montmorillonite and reported that the reflection intensity was increased in the meridian direction by in-plane orienting montmorillonite.

Non-Patent Document 1: Molecular Nanotechnology 174$^{th}$ Conference, first Seminar, Preprints, p 22-23, Jul. 13, 2007

Further, with respect to piercing strength, this characteristic can be exhibited by increasing the in-plane orientation of a polyamide resin. If a layered compound is added to further heighten the piercing strength, contrarily the stretching ratio cannot be increased, and thus there is a problem that the piercing strength is scarcely improved as compared with a film containing no layered inorganic compound.

As described, in the extension of conventional techniques, the industrial production of stretched films of polyamide resin having excellent mechanical properties has been difficult.

Also, generally, for providing the slipping property to films, particles are added as a lubricant to form projections on the surfaces. However, in the case of a polyamide film, since the resin becomes soft and the slipping property is lowered due to an increase in humidity, it is required to roughen the surface for achieving the desired slipping property even under high humidity. Therefore, there occurs a problem of worsening the gloss in a polyamide film having improved slipping property under high humidity.

BRIEF SUMMARY OF THE INVENTION

The invention provides a biaxially stretched polyamide resin film containing 0.3 to 10 wt. % of an inorganic material including an layered compound, wherein the layered compound is in-plane oriented and the film has a haze of 1.0 to 20%, an elastic modulus in the longitudinal direction of 1.7 to 3.5 GPa at a relative humidity of 35% RH, a surface roughness (Sa) of 0.01 to 0.1 μm, and a static friction coefficient (F/B) of 0.3 to 1.0 at a normal stress of 0.5 N/cm$^2$.

The invention also provides a biaxially stretched multilayer polyamide resin film having 8 or more layers in total and using a same resin composition for 80% based on the ratio of the number of the layers, wherein the film is stretched 2.5 to 5.0 times in the longitudinal direction of the film and has an in-plane orientation coefficient (ΔP) of 0.057 to 0.07 and a strain of 0.1 to 2.0% after boiling treatment.

BRIEF DESCRIPTION OF THE DRAWING

The FIGURE is an X-ray diffraction intensity plot of Example 8.

DETAILED DESCRIPTION OF THE INVENTION

Problems to be Solved by the Invention

The first invention aims to provide a polyamide resin film excellent in dimensional stability with respect to moisture absorption, mechanical characteristics and a slipping property under high humidity and high temperature, and a handling property. The film is prepared by stretching a polyamide resin in which a layered compound represented by a layered silicate is evenly dispersed and which is conventionally difficult to be stretched in the same stretching conditions as those for a conventional polyamide resin containing no layered compound. Further, the first invention aims to provide a film in which a layered compound is high-dimensionally oriented, which has been conventionally thought to be impossible, and thus to provide a biaxially stretched polyamide resin film having sufficient in-plane orientation while containing a large quantity of a layered inorganic compound. The resulting film is particularly excellent in mechanical characteristics, a barrier property, heat resistance, dimensional stability, and a piercing property with little fluctuation of mechanical characteristics due to changes in humidity.

The second invention aims to provide a biaxially stretched multilayer polyamide resin film with suppressed boiling strains, excellent dimensional stability, and improved pinhole resistance. These improved properties can be provided by lowering the shrinkage stress caused at the time of boiling by lowering the stress at the time of stretching and consequently decreasing bowing of the film.

Means to Solve the Problems

Inventors of the invention thought that the easy formation of cracks along a layered compound was due to stress in the perpendicular direction to the plane of the layered compound as a result of stretching. As a result, the inventors investigated the orientation state of the layered compound and methods to decrease the stretching stress and consequently, considered that in a conventional method, a large stress was applied to the molecular chains in the width and thickness directions at the time of lengthwise stretching of a cast sheet since the molecular chains were fixed by the layered compound and thus the successive high stretching in the width direction was difficult. Accordingly, the inventors developed a method for promoting orientation of the layered compound in the in-plane direction by evenly applying the shear stress to the sheet at the time of casting and thereby suppressing the formation of creases and cracks formed by stress converged on the tip end of the layered compound. At the same time, the method was capable of lowering the entanglement density in the thickness direction. The inventors further made investigations in detail on causes of decreasing the stretching property. Accordingly, paying attention to the in-plane orientation of the dispersed inorganic layered compound besides the resin of the matrix and referring to the report by Nishino et al, the inventors of the invention quantitatively measured the orientation degree of the layered compound and investigated the relationship of characteristics. It was consequently found that in a film obtained by employing such methods, a layered compound could be oriented in a very high level and that a film contained a layered compound oriented in a high level excellent characteristics, which a conventional film never had in the case the in-plane orientation degree measured from a half width of an x-ray diffraction peak derived from the dispersed layered compound became a specified value or higher, and these findings now lead to completion of the invention.

That is, the invention has the following configurations.

1. A biaxially stretched polyamide resin film containing 0.3 to 10 wt. % of an inorganic material including a layered compound, in which the layered compound is in-plane oriented and the film has a haze of 1.0 to 20%, an elastic modulus in the longitudinal direction of 1.7 to 3.5 GPa at a relative humidity of 35% RH, a surface roughness (Sa) of 0.01 to 0.1 μm, and a static friction coefficient (F/B) of 0.3 to 1.0 at a normal stress of 0.5 N/cm$^2$.

2. The biaxially stretched polyamide resin film as described in 1, wherein the number of pinholes after 1000 times Gelbo Flex test at 23° C. is 0 to 30.

3. The biaxially stretched polyamide resin film as described in 1 or 2, wherein the film is transversely stretched at a transverse stretching temperature of 50 to 155° C.

4. The biaxially stretched polyamide multilayer film as described in 1, wherein the film has a laminate structure of 8 or more layers in total and a thickness of 3 to 200 μm, and the in-plane orientation degree of the inorganic layered compound measured by x-ray diffractometry is in a range of 0.4 to 1.0.

5. The biaxially stretched polyamide multilayer film as described in 4, wherein a static mixer method is employed at the time of melt extrusion of a thermoplastic resin and the resin temperature immediately before introduction into the static mixer is in a range from the melting point to melting point +70° C. and the heater temperature in the latter half of the static mixer is set to be higher by 5° C. or more and by 40° C. or less than the resin temperature immediately before introduction into the static mixer.

6. The biaxially stretched polyamide resin film as described in 1, wherein the layered compound is in-plane oriented and the in-plane orientation (ΔP) of the film is 0.057 to 0.075, and the value of piercing strength/thickness of the film is 0.88 to 2.50 (N/μm).

7. The biaxially stretched polyamide resin film as described in 6, wherein the stretching ratio on the basis of an area by biaxial stretching measured as the product of the stretching ratio in the lengthwise direction and the stretching ratio in the transverse direction is 8.5 times or more.

8. The biaxially stretched polyamide resin film as described in 6 or 7, wherein biaxial stretching is successive biaxial stretching in lengthwise stretching-transverse stretching order and when Ny is defined as a refractive index in the center part in the width direction of the film, the difference Ny(A)−Ny(B) between Ny(A) which is Ny of the sheet before lengthwise stretching and Ny(B) which is Ny of the sheet after uniaxial stretching is 0.003 or higher.

9. The biaxially stretched polyamide resin film as described in 1, wherein the film has a laminate structure of 8 or more layers, the film is obtained by stretching as much as 2.5 to 5.0 times in the longitudinal direction and 3.0 to 5.0 times in the width direction, and the film has a ratio of the product (X1) of the maximum point stress (MPa) and a breaking elongation (%) of a sample stored at a humidity of 40% for 12 hours and the product (X2) of the maximum point stress (MPa) and a breaking elongation (%) of a sample stored at a relative humidity of 80% for 12 hours is in a range of 1.0 to 1.5 when the maximum point stress and breaking elongation is measured by a method as described in JIS K 7113 under conditions of a starting length of 40 mm, a width of 10 mm, and a deformation rate of 200 mm/min after storage at an equilibrium water absorption ratio of 3.0 to 7.0% and a relative humidity of 40%.

10. A biaxially stretched multilayer polyamide resin film having 8 or more layers in total and using a same resin composition for 80% based on the ratio of the number of the layers, wherein the film is stretched 2.5 to 5.0 times in the longitudinal direction of the film and has an in-plane orientation coefficient (ΔP) of 0.057 to 0.07 and a strain of 0.1 to 2.0% after boiling treatment.

11. The biaxially stretched multilayer polyamide resin film as described in 10, wherein the film contains 0.3 to 10 wt. % of an inorganic material containing a layered compound, the layered compound is in-plane oriented, and the oxygen permeation amount in conversion into 15 μm is 0.05 to 18 cc.

12. The biaxially stretched multilayer polyamide resin film as described in 10 or 11, wherein at least one layer or more of resin layers containing a polyamide resin having a meta-xylylene skeleton as a main component are laminated.

Effects of the Invention

According to the first invention, a polyamide resin containing a layered compound evenly dispersed therein, which conventionally has been understood to be difficult to obtain with good strength and appearance by a conventional stretching method, can be stretched evenly without deteriorating the appearance. As a result, according to this method, it is possible to provide a polyamide resin film having an excellent slipping property under high humidity and with excellent surface gloss, which is generally difficult to be satisfactorily provided in a single film.

Also, according to the first invention, it is made possible to provide a film with excellent characteristics, particularly, a barrier property, mechanical characteristics, a piercing strength, and little strength fluctuation in accordance with humidity levels, and that includes a nano-composite resin containing a layered compound evenly dispersed therein, which has been supposed to be difficult to obtain with good strength and appearance by a conventional stretching method.

Further, the occurrence of cleavage in the thickness direction of a film, which is a problem with multi-layering, can be improved for a multilayer film obtained by a static mixer method by (i) keeping the resin temperature immediately before introduction into the static mixer in a range from the melting point to melting point +70° C. and (ii) keeping the heater temperature in the latter half of the static mixer higher by 5° C. or more and by 40° C. or less than the resin temperature immediately before introduction into the static mixer.

According to the second invention, under the conditions for a monolayer polyamide resin film, a resin sheet having a multilayer structure with the same composition is stretched to give a film with reduced bowing and little boiling strain even at the end parts in the width direction. Also, use of a polyamide resin in which a layered compound is evenly dispersed provides a film excellent in not only the boiling strain but also the barrier property and remarkably usable as a wrapping material. In addition, JP-A No. 2007-196635 is a patent application for a multilayer film; however it does not mention decrease of stress by multilayer formation at the time of stretching in the published specification and thus the invention is a fact which has not been known.

BEST MODE FOR CARRYING OUT THE INVENTION

Hereinafter, at first, the first invention will be described in detail.

(Polyamide Resin)

A polyamide resin to be used in the invention is not particularly limited and may include a ring-opening polymers of cyclic lactams, condensates of diamines and dicarboxylic acids, and self condensates of amino acids. Typical examples are not particularly limited, but include nylon 6, nylon 7, nylon 66, nylon 11, nylon 12, nylon 4, nylon 46, nylon 69, nylon 612, and m-xylene diamine type nylon. Copolymer type polyamide resins may be also used, such as aromatic polyamide resins, including nylon 6 and nylon 66 copolymerized with m-xylylenediamine, nylon 6T, nylon 6I, nylon 6/6T copolymers, nylon 6/6I copolymers, nylon 6/polyalkylene glycol resins, nylon 11/polyalkylene glycol resins, nylon 12/polyalkylene glycol resins, nylon 6/MXD 6 copolymers. Additional usable resins are those obtained by copolymerization of other components with these resins and preferable examples are nylon 6, nylon 66, and m-xylylenediamine type nylon. Particularly, the gas permeability is remarkably decreased by laminating a few layers of a m-xylylenediamine type nylon resin, and thus a m-xylylenediamine type nylon resin is a preferable embodiment.

Further, besides the polyamide resin described below, other resins and additives may be added to these resins for use. Moreover, in terms of the economy, one preferred embodiment is use of a recovered film produced by the invention for a part or all of a polyamide resin. Usable examples of other resins are conventionally known resins such as polyester resins, polyurethane resins, acrylic resins, polycarbonate resins, polyolefin resins, polyester elastomer resins, and polyamide elastomer resins and not limited thereto.

(Layered Compound)

Examples of the layered compound are not limited to, but are layered compounds such as swelling mica, clay, montmorillonite, smectite, hydrotalcite, etc., which are usable regardless of being inorganic and organic. The form of the layered compound is not particularly limited; however, a layered compound having an average length of the longer diameter of 0.01 to 50 μm, preferably 0.03 to 20 μm, even more preferably 0.05 to 12 μm and an aspect ratio of 5 to 5000, preferably 10 to 5000 preferably is used. With respect to the aspect ratio of the layered compound, in the case the aim for addition is improvement of the barrier property, a layered compound with a high aspect ratio is preferable. When the aim of addition is mechanical reinforcement, a layered compound with a low aspect ratio is preferable.

The addition amount of an inorganic material including a layered compound with respect to the above-mentioned polyamide resin is preferably 0.3 to 10 wt. %. An inorganic layered compound is sometimes added in the form of an organically treated layered compound, and the addition amount and the content (addition amount) of the inorganic material according to the weight residue described below do not necessarily correspond with each other. Further, if a method for measuring the inorganic material from the residue weight as described below is employed, a small amount of an inorganic material other than the inorganic layered compound is added in some cases and in the invention, it is calculated as the content of the inorganic material including the layered compound. The content of the inorganic material including the layered compound is a value calculated by subtracting the ash from the residue weight measured by a thermogravimetric analyzer (TGA). In particular, the content is calculated by measuring the residue weight after increasing the temperature of a resin containing a layered compound from room temperature to 550° C. and thereafter subtracting the value of resin ash therefrom. In Example 1, the inorganic content can be measured to be 2.6% by subtracting 1.8% of residue weight derived from the resin from 4.4% of residue weight by TGA. Also, the ratio of an organic treatment agent in the layered compound is separately measured by TGA, and calculation using the numeral value can be employed. The lower limit of the addition amount of the inorganic material including a layered compound is preferably 0.3%, furthermore preferably 0.7%, and even more preferably 1.0%. If the addition amount is less than 0.3%, the effect of the layered compound addition is slight in terms of the dimensional stability and mechanical characteristics, and thus it is not preferable. Also, the static friction coefficient may be increased, and the slipping property may be worsened. The upper limit is more preferably 10% or less and furthermore preferably 8% or less. If the addition amount is more than 10%, the effect in terms of the dimensional stability and mechanical characteristics is saturated and it is not economical. Moreover, the fluidity at the time of melting is lowered, the surface roughness becomes unnecessarily significant, and the haze may be lowered.

Common layered compounds may be used. Organically treated commercialized products preferably usable in a monomer insertion polymerization method described below are CLOISITE™ produced by Southern Clay Products Inc., SOMASIF™ and LUCENTITE™ produced by Co-op Chemical Co., Ltd., and S-Ben produced by Hojun Yoko Co., Ltd.

(Thermoplastic Resin Containing Layered Compound Evenly Dispersed Therein)

A thermoplastic resin containing a layered compound evenly dispersed therein is commonly called a nano-composite resin. The layered compound is preferably evenly dispersed and does not contain coarse matter with a thickness exceeding 2 μm in the form of aggregates of the layered compound. In the case coarse matter with a thickness exceeding 2 μm is included in the layered compound, the transparency is lowered and stretching property of the resulting film is lowered, and therefore, it is not preferable.

The layered compound is preferable to be evenly dispersed in the above-mentioned polyamide resin in the invention and the film production method can be exemplified as follows.

1. Interlayer insertion method
   1) monomer insertion polymerization method
   2) polymer insertion method
   3) organic lower molecule insertion (organic swelling) kneading method
2. In-situ method: In-situ filler formation method (sol-gel method)
3. Ultrafine particle direct dispersion method, etc.

Commercialized materials may include CRESS-ALON™ NF 3040 and NF 3020 produced by Nanopolymer Composite Corp.; NCH 1015C2 produced by Ube Industries Ltd.; and IMPERM™ 103 and IMPERM™ 105 produced by Nanocor, Inc. In order to heighten the dispersibility of the layered compound for suppressing the formation of coarse matter in the layered compound contained in the polyamide resin, it is preferable to treat the layered compound with various kinds of organic treatment agents. However, to avoid an adverse effect of thermal decomposition of a treatment agent at the time of melt molding, those obtained by using a low molecular weight compound with high heat stability or by a method such as the monomer insertion polymerization method in which a low molecular weight compound is not used are preferable. With respect to the heat stability, a treated layered compound having a 5% weight loss temperature of 150° C. or higher is preferable. TGA or the like can be employed for the measurement. In the case of a compound with inferior heat stability, foams may be formed in the film or coloring may be caused and therefore, it is not preferable (reference to "Challenging nano-technological materials: Polymer nano-composites in widened application development," Sumitomo Bakelite-Tsutsunaka Techno Co., Ltd.).

The layered compound is preferably in-plane oriented in a film for exhibiting desirable characteristics. The in-plane orientation can be confirmed by observing a cross section of the layered compound by a transmission electron microscope or a scanning electronic microscope.

(Film Formation Method)

In stretching of a resin containing a layered inorganic compound in the invention, problems in the case of stretching by employing successive biaxial stretching in lengthwise-transverse order, which is generally advantageous in terms of economy, are following three points: (1) in the stretching in the lengthwise direction (hereinafter, abbreviated as MD), crystallization proceeds due to the heat at the time of stretching and the stretching property in the transverse direction (hereinafter, abbreviated as TD) is lost after uniaxial stretching; (2) breaking occurs at the time of stretching in TD; and (3) breaking occurs at the time of thermal fixation after stretching in TD. With respect to (1), when the MD stretching conditions in which the TD stretching is possible and the MD stretching conditions in which the TD stretching is impossible are put in order, it is found that the refractive index in the width direction (refractive index in the y-axis, hereinafter, abbreviated as Ny) of a uniaxially stretched sheet after the MD stretching differs in each type of film. Concretely, it is found that Ny of a uniaxially stretched sheet, which is TD-stretchable, becomes low after the MD stretching. In contrast, Ny of a uniaxially stretched sheet, which is not TD-stretchable (that is, whitened or broken at the time of TD stretching), is scarcely changed or not at all changed after the MD stretching. It is found that in stretching of a common polyamide resin, Ny after the MD stretching becomes low simultaneously with occurrence of neck-in in the width direction at the time of the MD stretching. On the other hand, in the case a layered compound is added thereto, neck-in occurs, but Ny tends to be difficult to be low due to the interaction of the layered compound and polyamide resin molecules. The phenomenon is supposedly attributed to as follows: since the molecular chains of a film before stretching are oriented at random in the MD and TD directions, force is generated also in the TD direction at the time of stretching the molecular chains in the MD direction by the MD stretching. The force applied also in the TD direction can be released by the neck-in in the TD direction in the case of stretching of a common polyamide resin. On the other hand, in the case of the polyamide resin containing a layered compound, since the molecular chains are cramped by the presence of the layered compound, the force in the TD direction cannot be released and the molecular chains are put in the state as if they are pulled also in the TD direction. Moreover, the layered compound is rotated at the time of the MD stretching and therefore, molecules are pulled also in directions other than the MD direction. That is, the in-plane orientation is already in a high state after the MD stretching. Therefore, it is supposed that the stretching stress at the time of successively carrying out the TD stretching becomes high and breaking is caused.

As a method for solving this problem, stretching conditions in which Ny becomes small after the MD stretching are employed to make the TD stretching at a high ratio possible without causing breaking in the TD stretching successively carried out thereafter. Thus, it is made possible to produce a biaxially stretched polyamide resin film of the invention on an industrial scale.

In the case Ny(A) is defined as the refractive index in the width direction before lengthwise stretching and Ny(B) is defined as the refractive index in the width direction after lengthwise stretching, Ny(A)–Ny(B) is preferably 0.001 or higher. It is more preferably 0.002 or higher and most preferably 0.003 or higher.

As a method for lowering Ny after uniaxial stretching, a method of considerably lowering the MD stretching rate can be employed. A similar effect can be produced by multi-layering an un-stretched sheet after melt extrusion. That is, the entanglement density of molecular chains is lowered in the thickness direction by multi-layering and thus the deformability of the molecular chains is improved and Ny can be lowered. As a result, an increase of in-plane orientation at the time of the MD stretching can be suppressed, and the TD stretching property can be improved. The inventors have found that the biaxial stretching property can be improved by these methods and have completed a production method with high industrial applicability and a stretched film with excellent characteristics.

(Construction of Film)

The biaxially stretched polyamide resin film of the invention can be obtained essentially by stretching an un-stretched polyamide resin sheet containing a polyamide resin layer in which a layered compound is evenly dispersed. Basically a sheet with a monolayer construction is also stretchable, however from an industrial viewpoint, it is preferable to stretch a multilayer sheet.

Hereinafter, a case of multilayer formation will be described. With respect to the number of all layers and the thickness of a layer, the lower limit of the number of layers is preferably not less than 8 layers and more preferably not less than 16 layers. The upper limit of the number of the layers is preferably not more than 10,000 layers and more preferably not more than 5,000 layers. If the multilayer film is less than 8 layers, no stretching property improvement effect is exhibited, and the effect of the arrangement of the layered compound at the time of melt extrusion is lowered. On the other hand, if the multilayer film exceeds 10,000 layers, the effect of stretching property improvement is saturated, and the heat shrinkage ratio is lowered.

The lower limit of the thickness of a layer is preferably 10 nm and more preferably 100 nm in the state before stretching. If a layer is thinner than 10 nm, the crystal size in the layer becomes too small and the heat shrinkage ratio becomes high and therefore, it is not preferable.

The upper limit of the thickness of the layer is preferably not more than 30 μm and more preferably not more than 20 μm. If a layer exceeds 30 μm, the in-plane orientation of the layered compound in the state before stretching is low, and the effect on decreasing the stretching stress is small, and therefore it is not preferable.

(Laminating Method)

Besides laminating different kinds of resin as employed commonly, it is possible to layer the same kind of resin. Herein, although it seems difficult to find the physical meaning of multi-layering with the same kind resin by a method described below, in an actual system, an interface of layers does not disappear even in the case of the same resin is laminated by melt extrusion at the same temperature. Such interface exists even after stretching. The interface is the same as that of a welded line of an injection-molded product, which is difficult to eliminate. As described, even when the same type resin is used, a multilayer state is maintained, and the entanglement of molecules in the thickness direction can be suppressed and kept low. A method for confirming the existence of an interface of layers at the time of laminating the same kind of resin by melt extrusion may be a method of cooling a sample with ice or liquefied nitrogen, producing a cross section by cutting the sample with a razor or the like thereafter, immersing the obtained sample in a solvent, such as acetone, and observing the cross section with a microscope.

A polyamide resin and a resin composition composing other layers based on necessity are supplied separately to respective extruders and extruded at a temperature higher than melting temperature. The melting temperature is preferably lower by 5° C. than the decomposition starting temperature. Further, to suppress cracking of the layered compound in the resin, the melting conditions and melting temperature have to be set carefully. In the case of a polyamide resin with a high molecular weight, the layered compound is cracked if melting at such a low temperature as not higher than melting point +10° C. is carried out, and the aspect ratio becomes smaller than that in the initial state. Thus, the effect of using a layered compound with a high aspect ratio is diminished, and therefore, it is preferable to carry out melting at a high temperature in a range with no problem in terms of heat stability.

A polyamide resin and a resin composition composing other layers based on necessity are laminated by various kinds of methods and a feed-block method and a multi-manifold method can be employed. In the case of the feed-block method, at the time of widening the width to the die width after laminating, if the melt viscosity difference between laminated layers and the temperature difference at the time of laminating are significant, the method results in laminating unevenness, deterioration of the appearance, and unevenness of the thickness. Therefore, the melt viscosity difference between laminated layers and the temperature difference at the time of laminating should be carefully controlled at the time of production. For suppression of occurrence of unevenness, it is preferable to control the melt viscosity at the time of extrusion by (1) lowering the temperature and (2) adding various kinds of additives such as polyfunctional epoxy compounds, isocyanate compounds, carbodiimide compounds, etc.

In the invention, promotion of orientation in the plane of the layered compound by the shear force at the time of laminating is also effective to suppress the breaking by convergence of the stress to the tip end of the layered compound at the time of stretching. As a method suitable for such a purpose, laminating by a feed block method and a static mixer method is preferable and in terms of the simplicity of facilities, the static mixer method is particularly preferable.

In the case of multi-layering by the static mixer method, it is preferable that the resin temperature immediately before introduction into the static mixer is in a range from the melting point to melting point +70° C., and that the heater temperature in the latter half of the static mixer is set to be in a range of higher by 5° C. or more and by 40° C. or less than the resin temperature immediately before introduction into the static mixer. If the resin temperature is lower than the melting point in the state before introduction into the static mixer, the melt viscosity is too high, the appearance is deteriorated, and the laminated state is disordered. Further, if the resin temperature is a temperature as high as the melting temperature +70° C. or higher, the melt viscosity is too low and the force needed for causing the above-mentioned stretching effect of the layered compound becomes low. Moreover, it is preferable that the heater temperature in the latter half of the static mixer is set to be higher than the resin temperature immediately before introduction into the static mixer. If the heater temperature difference is lower than 5° C., it results in appearance deterioration, such as streaking unevenness and formation of a portion with a thin thickness, which is a cause of breaking, and therefore, it is not preferable. If the heater temperature exceeds 40° C., the melt viscosity is too low and the force needed for causing the above-mentioned stretching effect of the layered compound becomes low and therefore, it is not preferable. The melting temperature difference between respective layers at the time of laminating a thermoplastic resin is 70° C. or lower, preferably 50° C. or lower, and more preferably 30° C. or lower. The melt viscosity difference between respective layers is within 30 times, preferably within 20 times, and more preferably within 10 times at the estimated shear rate in a die, so that appearance control at the time of laminating and unevenness suppression are made possible. For adjustment of the melt viscosity, addition of the above-mentioned polyfunctional compounds can be employed. The static mixer temperature or feed block temperature at the time of laminating is indispensably lower than the 5% decomposition temperature of the resin and further, it is in a range of preferably melting point +20 to melting point +150° C., more preferably melting point +30° C. to melting point +120° C., and most preferably melting point +40° C. to melting point +110° C. When the feed block temperature is too low, the melt viscosity becomes too high and the load on the extruder becomes too high and therefore, it is not preferable. When the temperature is too high, the viscosity is too low and laminating unevenness occurs and therefore, it is not preferable. Further, the film after biaxial stretching tends to have cleavage due to the multi-layering and in this case, the temperature of the latter half part of the static mixer and feed block and the temperature of dies are so sufficiently high as to increase the entanglement of the molecular chains in the interlayer and therefore it can be improved. Concretely, in the case of a static mixer, the cleavage suppression effect can be exhibited by increasing the outlet temperature to be higher by 5° C. to 40° C. than the inlet temperature.

Further, laminating is possible by a multi-manifold method and the above-mentioned problem of laminating unevenness is minimized. However, when laminating a layer with a melt viscosity difference, there occurs a problem of a turning-around failure of the resins in the respective layers in the end parts and unevenness of the laminating ratio in the end parts in terms of productivity and also in this case, it is preferable to control the melt viscosity difference.

For the die temperature, it is the same as described above and it is in a range of 150° C. to 300° C., preferably 170° C. to 290° C., and more preferably 180° C. to 285° C. If the temperature becomes too low, the melt viscosity becomes too high and the surface roughening occurs to result in appearance deterioration. If the temperature becomes too high, thermal decomposition of the resin is caused and, as described, the melt viscosity difference becomes wide and unevenness is caused and particularly, unevenness with small pitches is caused.

With respect to each layer before stretching, the thickness of each layer is preferably in a range of 0.01 to 30 μm. If the thickness of each resin layer exceeds 30 μm, the effect of improving the stretching property is lowered and therefore, it is not preferable for the invention. If the thickness of each resin layer is less than 0.01 μm, the heat shrinkage ratio after thermal fixation becomes high and it becomes difficult to keep good balance among various film properties, and therefore, it is not preferable.

(Stretching Method)

For a biaxially stretched polyamide resin film of the invention, an un-stretched sheet extruded by melt extrusion from a T die can be stretched by successive biaxial stretching or simultaneous biaxial stretching. In addition, a method such as a tubular manner can be employed. However, to carry out sufficient orientation, a method using a biaxial stretching apparatus is preferable. In terms of the characteristics and economy, a preferable method is a method of stretching in the lengthwise direction by a roll type stretching apparatus and thereafter stretching in the transverse direction by a tenter type stretching apparatus (successive biaxial stretching method). Further, with respect to the MD stretching, it is described above that it is preferable to lower Ny at the time of the MD stretching for improving the TD stretching property. In order to lower Ny while increasing the MD stretching ratio, it is preferable to employ multi-step MD stretching.

It is preferable to obtain the film by stretching a substantially un-oriented polyamide resin sheet obtained by melt extrusion from a T die 2.5 to 10 times as large as the film in the lengthwise direction at a temperature equal to or higher than the glass transition temperature $Tg°$ C. of the polyamide resin and not higher than 150° C. Next, the lengthwise stretched film is stretched 3.0 to 10 times as large in the transverse direction at a temperature of not lower than 50° C. and not higher than 155° C. of polyamide resins. Next, the biaxially stretched polyamide resin film is thermally fixed in a temperature range of 150° C. to 250° C.

The heating crystallization temperature can be measured by increasing the temperature of a sample resin which has been quenched after melting by DSC.

In the MD stretching, if the temperature of the film is lower than the glass transition temperature (Tg) of the polyamide, problems of breaking and unevenness of the thickness due to the oriented crystallization by stretching occurs. On the other hand, if the film temperature exceeds 150° C., breaking is caused due to the crystallization by heat. Further, if the stretching ratio in the MD stretching is less than 1.1 times, problems such as unevenness of the thickness and insufficient strength in the lengthwise direction are caused. If the stretching ratio in the MD stretching exceeds 10 times, there occurs a problem that successive TD stretching becomes difficult. The stretching ratio is preferably 3.0 to 5.0 times.

When the film temperature in the TD stretching is a low temperature of less than 50° C., the TD stretching property is bad and breaking occurs and unevenness of the thickness in the TD direction attributed to the neck stretching becomes significant. When the film temperature is a high temperature beyond (Tm)—20° C., unevenness of the thickness becomes significant and therefore, it is not preferable. Further, if the TD stretching ratio is less than 1.1 times, unevenness of the thickness in the TD direction becomes significant, the strength in the TD direction is lowered, and the in-plane orientation becomes inferior, which results in worsening of the characteristics not only in the TD direction but also in the MD direction. The stretching ratio is preferably 3 times or more. On the other hand, if the TD stretching ratio is a high ratio beyond 10 times, practical stretching is difficult. The TD stretching ratio is preferably 3.0 to 5.0 times.

With respect to the stretching temperature, stretching at a low temperature is preferable in terms of sufficient exhibition of the addition effect of the layered silicate, unevenness of thickness of the film, and Gelbo Flex resistance. A preferable condition may be stretching at a film temperature of 155° C. or lower at the time of stretching.

Further, the film thickness after stretching is preferably in a range of 3 to 200 μm. If the film thickness is lower than 3 μm, the handling of the film is worsened and therefore, it is not preferable. If the film thickness exceeds 200 μm, the effect of inorganic composite formation is diminished and therefore, it is not preferable.

A preferable production method of the invention may be a method by cutting both end parts of an un-stretched sheet, which is multi-layered by a static mixer method or a feed block method, in the width direction by a method of cutting off based on necessity, adjusting the thickness of each laminated layer to be 30 μm or thinner at the most end part before stretching, and thereafter carrying out stretching at least in one direction. In the above-mentioned multi-layer formation method, although depending on the structure of the dies, due to the imperfection of division of the layers and the disorder of the layers at the time of laminating, the number of the layers in the end part is sometime lessened and in this case, the layer thickness of the polyamide resin containing a layered compound with an inferior stretching property in a dispersed state may be inevitably increased. Therefore, the layer thickness becomes thicker than 30 μm and the stretching property of only the end part is considerably lowered and at the time of stretching, a phenomenon such as whitening and breaking is sometimes observed in the end part. In the invention, in such a case, to correct the layer thickness in the end part at the time of production to a desired thickness, one preferable method is trimming the end part of an un-stretched sheet and thereafter carrying out stretching.

(Thermal Fixation)

In the case a thermal fixation temperature is a low temperature below 150° C., the effect of dimensional stability improvement of the film by heat is slight and therefore, it is improper. On the other hand, in the case of a high temperature exceeding 250° C., the appearance of the film degrades due to whitening attributed to thermal crystallization of the polyamide and the mechanical strength is decreased, and therefore, it is improper.

In addition, the density increase due to crystallization in the thermal fixation after the TD stretching and the accompanying volume shrinkage are caused, and in the case of the resin containing the layered compound, the stress to be generated is remarkably high and therefore, stress is applied in the MD direction by sharp heating and it sometimes results in breaking. Therefore, as a heating method at the time of thermal fixation, it is preferable to increase the heat quantity step by step, and thus generation of acute shrinkage stress is suppressed. A concrete method is exemplified as a method of gradually increasing the temperature or increasing the air blow amount toward the surrounding of the outlet from the surrounding of the inlet of a thermal fixation zone. Preferably, the air blow amount is gradually increased in terms of the heat shrinkage ratio after stretching and thermal fixation.

Further, with respect to the relaxation treatment, taking the balance with the heat shrinkage ratio in the lengthwise direction into consideration, it is preferable to determine the relaxation ratio. In the invention, since the change of the dimensional stability with respect to humidity in the lengthwise direction is small, the relaxation ratio is preferably in a range of 0 to 5%. If the relaxation ratio exceeds 5%, the effect on decrease of the heat shrinkage ratio in the width direction is slight and therefore, it is not preferable.

Next, a method for considerably lowering the MD stretching rate as another exemplified method will be described.

The method for considerably lowering the MD stretching rate is preferable to lower the MD stretching rate of 2000%/min or less. It is more preferably 1000%/min or less. In such a low rate MD stretching, since it is possible to carry out stretching while loosening the molecular chains cramped by the layered compound, it is contemplated that Ny is lowered after the MD stretching. In addition, the conditions described above can be employed for the temperature of the MD stretching, conditions of the TD stretching, and thermal fixation conditions.

A film obtained as described herein can be used industrially in various applications in form of a roll film wound around a paper tube or as it is or after being processed for, for instance, printing or lamination. The width of the roll film is preferably 30 cm or wider. The length is preferably 500 m or longer. The upper limit of the width is about 600 cm and the upper limit of the length is about 20,000 m. Those films with a wide width or a long length immediately after film formation can be slit in accordance with the use and commonly, used in form of a roll film with a width of 200 cm or narrower and a length of 8000 m or shorter.

(In-Plane Orientation of Polyamide Resin Film)

After the biaxial stretching, thermal fixation, and relaxation treatment, the polyamide resin film of the invention has an in-plane orientation ($\Delta P$) preferably 0.03 or higher, and more preferably 0.05 or higher. The in-plane orientation can be measured by measuring birefringence with a refractive index meter and carrying out a calculation according to the following expression:

$$\Delta P = (Nx+Ny)/2 - Nz,$$

wherein Nx is the refractive index in the longitudinal direction; Ny is the refractive index in the width direction; and Nz is the refractive index in the thickness direction.

If $\Delta P$ exceeds 0.07, the productivity is lowered and therefore, it is not preferable.

After the biaxial stretching, thermal fixation, and relaxation treatment, the biaxially stretched polyamide resin film of the invention has an in-plane orientation ($\Delta P$) of preferably 0.057 to 0.075 and particularly preferably 0.059 to 0.07. The in-plane orientation can be increased by increasing the biaxial stretching ratio, particularly the TD stretching ratio. If the in-plane orientation is less than 0.057, the piercing strength of the film is lowered and therefore, it is not preferable. Also, if the in-plane orientation exceeds 0.075, the productivity is lowered and therefore, it is not so preferable.

(Film Characteristics—Piercing Strength)

The piercing strength of the biaxially stretched polyamide resin film of the invention is preferable to have a value satisfying a relational expression of piercing strength/thickness (N/μm)=0.80 to 2.0. If the piercing strength is less than 0.80 N/μm, the piercing strength is low and not preferable for the aim of the invention. Further, it is more preferably 0.90 or higher. The upper limit is preferably 1.80 or lower. In the case of a production condition of exceeding 1.80, the operational property is lowered and therefore, it is not preferable.

The piercing strength is improved by both of the effect of the layered compound and the effect of heightening the in-plane orientation. For improvement of the piercing strength, it is preferable to increase the addition amount of the layered compound and simultaneously increase the in-plane orientation. It is preferable to satisfy at least the condition that the layered compound addition is 0.3% or more, and the in-plane orientation is 0.057 or higher. To obtain a film with a high piercing strength, as described above, the stretching ratio based on the area after the biaxial stretching is adjusted to be preferably 8.5 times or higher and further preferably 12 times or higher. If the stretching ratio based on the area is less than 8.5 times, the in-plane orientation is not heightened and the piercing strength is not improved. Also, the stretching ratio based on the area is preferably in a range of 8.5 to 40 times, and if it exceeds 40 times, the operational property is worsened.

(Film Characteristic—In-Plane Orientation of Inorganic Layered Compound)

The film of the invention is improved in the heat resistance, barrier property, dimensional stability, and mechanical characteristics by highly orienting the layered compound in the plane. The thermoplastic multilayer film in the invention preferably has an in-plane orientation of the layered compound measured by x-ray diffractometry in a range of 0.4 to 1.0. Herein, the in-plane orientation is a numeral value calculated from the half width of the (0n0) peak of the layered compound according to the following expression:

$$\text{In-plane orientation} = (180 - \text{half width})/180.$$

If the in-plane orientation is less than 0.4, the in-plane orientation is low and the effect of the addition of the layered compound is diminished and therefore, it is not preferable.

To increase the in-plane orientation of the layered compound, a stretching ratio of 6 times or more based on the area is preferable, and a stretching ratio of 3 times or more in the transverse direction is further preferable. If the stretching ratio is less than 6 times based on the area, the arrangement of the layered compound is insufficient and the characteristic improvement effect is low. If the stretching ratio exceeds 50 times based on the area, the production difficulties exceed the desired effect and therefore, it is not preferable in terms of productivity. To obtain a film having an in-plane orientation ($\Delta P$) of the biaxially stretched polyamide resin film of the invention in a range of 0.057 to 0.075 and a value of the film piercing strength/thickness (N/μm) in a range of 0.88 to 2.0, with respect to the stretching ratio of the film, the stretching ratio based on the surface area after biaxial stretching, which is calculated as the product of the stretching ratios in the longitudinal direction and in the width direction, is in a range of preferably 8.5 to 40 times and more preferably 12 times or more. If the stretching ratio based on the surface area is less than 8.5 times, the in-plane orientation is not increased and the piercing strength is not improved.

The multilayer stretched film containing the layered compound arranged in the plane of the invention has excellent heat resistance and mechanical characteristics. With respect to the heat resistance, the temperature at which the storage elastic modulus starts decreasing near Tg in dynamic viscoelasticity can be shifted to a high temperature side in some cases. This is attributed to the reinforcing effect of suppressing the movement of the molecular chains of the thermoplastic resin by the layered compound. If the arrangement of the layered compound is insufficient, the effect is slight.

The multilayer stretched film containing the layered compound arranged in the plane of the invention has an excellent oxygen barrier property. For example, when 0.3 to 15% as an addition amount of an inorganic material including a layered compound is added to the polyamide resin, the oxygen permeability (20 to 25 cc/m$^2$/day/atm) of the biaxially stretched polyamide resin in conversion into 15 μm can be lowered to about 5 to 15 cc/m$^2$/day/atm. If the addition amount is less than 1%, the barrier property improvement effect is slight and if the addition amount exceeds 10 wt. %, the barrier property improvement effect is saturated and it is not economical. The same effect can be similarly be observed for polyester resins and polypropylene resins.

(Film Characteristics—Haze)

The haze of the biaxially stretched polyamide resin film of the invention is preferably in a range of 1.0 to 20%. If the haze at the time of stretching is 1.0% or lower, stable production becomes difficult and therefore, it is not preferable. If the haze exceeds 20%, it becomes difficult to see contents at the time of use. In addition, the design property is deteriorated and therefore, it is not preferable.

The haze in the invention is the total derived from the resin, the inorganic layered compound, and voids formed by separation of the resin from the inorganic layered compound surface at the time of stretching. It is preferable to decrease haze specifically derived from the voids and in order to do that, the stretching conditions are carefully set. For example, when the MD temperature is too low, the haze is increased due to void formation and therefore, it is not preferable. When the TD temperature is too high, haze increase is observed due to crystallization and therefore, it is not preferable. A preferable temperature range is as described above and can be adjusted with reference to these facts. Further, the temperature can be adjusted in accordance with the size and type of the layered compound. For example, not only use of the layered compound with a size smaller than the wavelength of visible light makes the haze small but also use of the layered compound with a refractive index close to that of the resin makes the haze small.

(Film Characteristics—Surface Roughness, Static Friction Coefficient)

The biaxially stretched polyamide resin film of the invention is preferable to have a static friction coefficient (F/B) within a range of 0.3 to 1.0 at a normal stress of 0.5 N/cm$^2$ while having so extremely smooth surface as to have a surface roughness (Sa) of 0.01 to 0.1 μm. In general, if the surface roughness is made low to heighten the surface gloss, the static friction coefficient is increased and films will not slide on each other, particularly in a high humidity condition, resulting in various kinds of production troubles. However, the specific surface smoothness and the slipping property are both satisfied by biaxial stretching the polyamide resin containing an addition amount of 0.3 to 10 wt. % of the inorganic material including a layered compound in the invention at a sufficient area ratio. This is supposedly attributed to that the effect of the layered compound addition can be exhibited at a high level and a high elastic modulus can be maintained in a wide range from a low humidity to a high humidity. If the surface roughness is lower than 0.01, the slipping property is sometimes worsened and therefore, it is not preferable. Also, if the surface roughness exceeds 0.1 μm, the surface gloss is not different from that of a system to which a common lubricant is added and it does not meet the objective of the invention. In the case the static friction coefficient exceeds 1.0, the slipping property is worsened and therefore, it is not preferable. The lower limit of the static friction coefficient is 0.3 or less.

The surface roughness can be increased by increasing the addition amount of the layered compound. The surface roughness also can be adjusted in accordance with the size, form, or the like of the layered compound to be added. The static friction coefficient can be adjusted by the surface roughness. In addition, the elastic modulus can be increased by increasing the stretching ratio, particularly the stretching ratio in the width direction, and the static friction coefficient can be controlled accordingly.

Further, that the surface smoothness and the slipping property are both satisfied simultaneously without the need for a powder lubricant, such as spherical silica, is a characteristic of the invention. However, the surface roughness and the slipping property can be adjusted by adding a powder lubricant in accordance with the use. In the case of addition, the average particle diameter of the lubricant particles is preferably 0.1 to 10 μm and more preferably 0.3 to 5 μm. The average value of the particle diameter can be measured by measuring the diameter by an electron microscope and calculating the average. The addition amount is preferably 1000 ppm or lower and more preferably 700 ppm or lower.

If the average particle diameter is 0.1 μm or less, it is too small to change the surface roughness and therefore, it is not preferable. In the case particles with an average particle diameter exceeding 10 μm are used or in the case the addition amount exceeds 1000 ppm, it sometimes becomes difficult to adjust the surface roughness to be 0.1 μm or less and therefore, it is not preferable.

The surface roughness (Sa) can be properly adjusted to be 0.01 μm to 0.1 μm with reference to the above-mentioned preferable ranges. An adjustment method for preventing Sa from exceeding 0.1 μm may be lessening the addition amount in the case the particle diameter is large. In addition, particles with a large oil supply amount can be used, which is easy to be broken at the time of stretching in the case the particles are agglomerates (secondary particles) of primary particles with a fine particle size; etc. As the particles, various kind particles such as silica, alumina, zirconia, titania, crosslinked acrylic beads, crosslinked styrene beads, benzoguanamine, etc. may be used.

(Equilibrium Moisture Content)

The equilibrium moisture content of the biaxially stretched multilayer polyamide resin film of the invention is preferably in a range of 3.0 to 7.0%. The equilibrium moisture content becomes higher than that of a polyamide resin film containing no layered compound, and it is attributed to that the layered compound has a high water absorption property. The equilibrium moisture content is changed in accordance with the addition amount of the layered compound and also changed in accordance with the stretching conditions and it tends to be low along with increase of the in-plane orientation, so that the final equilibrium moisture content of the film can be determined by the addition amount of the layered compound and the stretching conditions. If the equilibrium moisture content is less than 3.0%, the elongation in a high humidity is lowered and therefore, it is not preferable. Also, if the equilibrium moisture content exceeds 7%, water is evaporated at the time of drying and a problem by water absorption may be caused at the time of processing and therefore, it is not preferable.

(Maximum Point Stress, Elongation)

The biaxially stretched multilayer polyamide resin film of the invention is preferable to have a ratio of the product (X1) of the maximum point stress (MPa) and a breaking elongation (%) of a sample stored at a humidity of 40% for 12 hours and a product (X2) at a humidity of 80% in a range of 1.0 to 1.5 when the maximum point stress and breaking elongation is measured by a method as described in JIS K 7113 under conditions of a starting length of 40 mm, a width of 10 mm, and a deformation rate of 200 mm/min after storage at a relative humidity of 40%. It is said that the film toughness can be measured by calculating the area in the lower side of a stress-strain curve. A common nylon film has both high elongation and high maximum point stress under a high humidity and is thus a film with extremely high ductility. On the other hand, both maximum point stress and elongation are low at a low humidity and for practical purposes, it is impossible to design the mechanical characteristics of a film in consideration of the effect of the humidity. Contrarily, as compared with a common nylon film, the inventors of the invention have found that a film containing a layered compound oriented in the plane has characteristics scarcely changed under a high humidity and is effective to increase the maximum point stress under a low humidity. As a reason for this, it is assumed that the addition of a material with high hygroscopic property can reinforce the mechanical characteristics under a low humidity. The hygroscopic property further provides proper mobility of molecular chains under a high humidity and thus prevents decrease of elongation or the like.

There is poly(ethylene terephthalate) as a film which is scarcely affected by humidity, and in this case, the ratio is around 1.0 and due to the closeness to 1.0, with respect to the above-mentioned characteristic, it can be said that the film has low humidity dependence. If the ratio exceeds 1.5, the film become highly humidity-dependent just like a common nylon film and it does not meet the aim of the invention. To make the ratio close to 1.0, the above-mentioned stretching conditions, particularly the stretching ratio in the MD direction and the stretching ratio in the TD direction, are important.

More specifically, the MD stretching ratio is preferably 2.5 to 5.0 times and more preferably 2.8 to 4.5 times. The MD stretching may be a one step or multi-step process. If the MD ratio is less than 2.8 times, the in-plane orientation after the biaxial stretching is not improved, and the mechanical characteristics at a low humidity are degraded. If the MD ratio exceeds 5 times, not only are characteristics, such as boiling strain, are degraded, and the stability at the time of stretching is lowered. The TD stretching ratio is preferably 3.0 to 6.0 times. If the TD stretching ratio is less than 3.0 times, the maximum point stress in MD under a low humidity becomes low. In addition, since the in-plane orientation is degraded, the piercing strength and pinhole resistance are lowered. If the TD stretching ratio exceeds 6.0 times, the characteristics under a low humidity and a high humidity fluctuate significantly. The TD stretching ratio is more preferably 3.0 to 5.0 times. In the invention, the stretching ratio on the basis of area is preferably in a range of 6 to 25 times and more preferably in a range of 9 to 22 times. If the stretching ratio on the basis of area is less than 6 times, no sufficient in-plane orientation can be obtained and the mechanical characteristics are degraded. If the stretching ratio on the basis of area exceeds 25 times, the shrinkage stress is increased and boiling stress is worsened.

(Film Characteristics—Elastic Modulus in MD Direction)

The biaxially stretched polyamide resin film of the invention preferably has an elastic modulus in the longitudinal direction (MD) in a range of 1.7 to 3.5 Gpa at a relative humidity of 35%. A polyamide resin film containing no layered compound shows high elongation and high ductility under a high humidity and contrarily shows low elongation and tends to be brittle under a low humidity. To increase the elastic modulus in the MD direction, it is necessary to heighten the stretching ratio not only in the MD direction but also in the TD direction, and thus there is a limit also in the stretching conditions. The biaxially stretched polyamide resin film described in the invention is enabled to keep the ductility and suppress the lowering of the elastic modulus at a high humidity and improve the elastic modulus and elongation at a low humidity. If the elastic modulus in MD is less than 1.7 GPa, the improvement effect is slight. If the elastic modulus exceeds 3.5 GPa, it becomes difficult to keep the balance with other characteristics.

(Film Characteristics—Heat Shrinkage Ratio)

The biaxially stretched polyamide resin film of the invention preferably has a heat shrinkage ratio at 160° C. for 10 minutes in a range of −3 to 3% in both the lengthwise direction and transverse direction. In order to make the heat shrinkage ratio close to zero, it is preferable to optimize the stretching conditions, thermal fixation condition, and the thickness of the layer. For improvement of the stretching property, it is advantageous that the thickness of each layer is thin. However, if the layer is too thin, the heat shrinkage ratio cannot be lowered by thermal fixation. Therefore, the layer structure preferably is produced in accordance with the aimed heat shrinkage ratio. To satisfy both the heat shrinkage ratio and the stretching property simultaneously, the thickness of each layer before stretching is preferably in a range of 1 to 30 μm and more preferably in a range of 2 to 20 μm. The lower limit of the heat shrinkage ratio is more preferably 0% or higher and even more preferably 0.1% or higher. The upper limit of the heat shrinkage ratio is more preferably 3.0% or lower and even more preferably 2.5% or lower.

(Film Characteristics—Pinhole Resistance)

The biaxially stretched film in the invention has excellent pinhole resistance, and the number of pinholes after 1000 times Gelbo Flex test at 23° C. is preferably 0 to 30. The pinhole resistance is mainly affected by the stretching conditions and particularly, it is preferable that the temperature at the time of TD stretching is increased not so high. In the case the TD stretching property is inferior, it is sometimes required to increase the temperature. However, if the stretching temperature is increased too high beyond the low temperature crystallization temperature, partial crystallization is promoted without progression of sufficient stretching and thickness unevenness and pinholes tend to be formed easily in fine regions. Also, pinholes can easily form in the obtained film. With respect to the TD stretching temperature, it is preferably 155° C. or lower. If the TD stretching temperature exceeds 155° C., the film tends to become brittle, and the pinhole resistance is worsened.

(Film Characteristics—Dimensional Change Ratio and Oxygen Permeability)

The biaxially stretched polyamide resin film in the invention is preferable to have a dimensional change ratio in both the lengthwise and transverse directions in a range of 0.1 to 1.0% at 25° C. and relative humidity of 35% and at 25° C. and relative humidity of 85%. The heat shrinkage ratio and the hygroscopic dimensional change ratio in the width direction can be slightly adjusted in accordance of the relaxation ratio in the width direction at the time of thermal fixation. However, the heat shrinkage ratio and hygroscopic dimensional change ratio are essential issues in the lengthwise direction and particularly in the successive biaxial stretching, it is very difficult to lower the hygroscopic dimensional change ratio while taking the balance of other characteristics into consideration. It is pointed out that a conventional polyamide resin tends to easily cause the dimensional change because of the disconnection of hydrogen bonds formed by the amide groups among the molecular chains by water. However, the polyamide resin in which the layered compound is evenly dispersed suppressed the effect of water due to the interaction of the layered compound and the amide groups in the molecular chains. It can be assumed that the hygroscopic dimensional change can be suppressed by using them; however, since conventionally there has been no proper stretching method, it is not actually achieved. It is made possible to provide highly advanced dimensional stability at the time of moisture absorption by stretching the sheet with a multilayer structure in the invention.

The biaxially stretched polyamide resin film in the invention contains the layered compound oriented in the plane and has an excellent barrier property with an oxygen permeability in conversion into 15 μm preferably in a range of 5 to 20 cc/m$^2$/day/atm. The upper limit of the oxygen permeability is preferably 19 cc/m$^2$/day/atm or lower, and more preferably 18 cc/m$^2$/day/atm or lower. Since the oxygen barrier property depends on the addition amount of the layered compound in the polyamide resin (X) and (Y), the addition amount of the layered compound is preferably in a range of 2 to 20 wt. % in the entire film. If the addition amount is less than 2 wt. %, the effect of the barrier property is slight, and if the addition amount exceeds 20 wt. %, the effect of barrier property improvement is saturated and it is not economical.

The biaxially stretched polyamide resin film of the invention may be subjected to corona treatment, coating treatment, or flame treatment to improve the adhesiveness and wettability in accordance with use. With respect to the coating treatment, an in-line coating method of stretching a coated product during film formation is preferably used. The biaxially stretched polyamide resin film of the invention is generally further processed by printing, deposition, lamination, etc. in accordance with the desired end use.

The biaxially stretched polyamide resin film of the invention may optionally contain a hydrolysis resistant improver, an antioxidant, a coloring agent (a pigment, a dye), an antistatic agent, a conductive agent, a flame retardant, a reinforcing agent, an organic lubricant, a nucleating agent, a release agent, a plasticizer, an adhesive aid, a pressure-sensitive adhesive, etc.

Next, the second invention will be described in detail.

Besides increasing the heat resistance of a resin, it is effective to lower the shrinkage stress at the time of boiling. The inventors of the invention have found that the stretching stress can be lowered by lowering the entanglement density of molecular chains in the thickness direction by a multilayer formation and thereby improving the ease of deformation of the molecular chains. As a result, the shrinkage stress can be lowered in spite of in-plane orientation same as that of a film with a monolayer structure. Also, the inventors have found that these methods can lower the bowing of the film, and that it is possible to provide a production method with high industrial applicability and a stretched film with excellent characteristics.

(Polyamide Resin)

A polyamide resin to be used in the invention is not particularly limited and may include a ring-opening polymers of cyclic lactams, condensates of diamines and dicarboxylic acids, and self condensates of amino acids. Suitable examples are not particularly limited, but include nylon 6, nylon 7, nylon 66, nylon 11, nylon 12, nylon 4, nylon 46, nylon 69, nylon 612, and m-xylene diamine type nylon. Copolymer type polyamide resins may be also used, such as aromatic polyamide resins, including nylon 6 and nylon 66 copolymerized with m-xylylenediamine, nylon 6T, nylon 6I, nylon 6/6T copolymers, nylon 6/6I copolymers, nylon 6/polyalkylene glycol resins, nylon 11/polyalkylene glycol resins, nylon 12/polyalkylene glycol resins, nylon 6/MXD 6 copolymers. Other usable resins are those obtained by copolymerization of other components with these resins and preferable examples are nylon 6, nylon 66, and m-xylylenediamine type nylon. Particularly, the gas permeability is remarkably decreased by laminating a few layers of a m-xylylenediamine type nylon resin, and thus it is preferably used.

Further, besides polyamide resin described below, other resins and additives may be added to these resins for use. Moreover, in terms of the economy, it is preferable to use a recovered film produced by the invention for a part or all of a polyamide resin. Usable examples of other resins are conventionally known resins such as polyester resins, polyurethane resins, acrylic resins, polycarbonate resins, polyolefin resins, polyester elastomer resins, and polyamide elastomer resins and not limited thereto.

With respect to the slipping property, various kinds of lubricants may be added to provide surface roughness, and both organic type lubricants and inorganic type lubricants can be used. Although not particularly limited in the invention, a sufficient slipping property can be provided without addition of these lubricants in the invention. The lubricant type to be added and the addition amount should be determined taking into account the various kinds of characteristics. In the case of an inorganic type lubricant, the particle diameter is preferably 0.5 µm or larger and more preferably 1 µm or larger. The addition amount is preferably in a range of 100 to 5000 ppm in the layer forming the surface layer. If the addition amount is less than 100 ppm, the addition effect is slight. If the addition amount exceeds 5000 ppm, the effect is saturated and therefore, it is not economical.

(Polyamide Resin Containing Layered Compound Evenly Dispersed Therein)

In the invention, besides a common polyamide resin, a polyamide resin containing a layered compound evenly dispersed therein, described below, can be used. In this case, the heat resistance, barrier property, and hygroscopic strain of a resin can be improved.

The polyamide resin containing layered compound evenly dispersed therein is commonly called nano-composite nylon. Typically, the layered compound is evenly dispersed and preferably contains no coarse material larger than 2 µm thickness. When the coarse material larger than 2 µm is contained, the transparency is lowered and the stretching property is deteriorated and therefore, it is not preferable.

Examples of the layered compound are not limited to, but are layered compounds, such as swelling mica, clay, montmorillonite, smectite, hydrotalcite, etc., which are usable regardless of being inorganic and organic. The form of the layered compound is not particularly limited. However, a layered compound having an average length of the longer diameter of 0.01 to 50 µm, preferably 0.03 to 20 µm, even more preferably 0.05 to 12 µm and an aspect ratio of 5 to 5000, preferably 10 to 5000 are preferably used. The addition amount of an inorganic layered compound with respect to the above-mentioned polyamide resin is preferably 0.3 to 10 wt. %. An inorganic layered compound is sometimes added in the form of an organically treated layered compound and the addition amount and the content (addition amount) of the inorganic material according to the weight residue described below do not necessarily correspond with each other. Further, if a method for measuring it from the residue weight as described below is employed, a small amount of an inorganic material other than the inorganic layered compound is added in some cases and in the invention, it is calculated as the content of the inorganic material including the layered compound. The content of the inorganic material including the layered compound is a value calculated by subtracting the ash from the residue weight measured by a thermogravimetric analyzer (TGA). More specifically, the addition amount is calculated by measuring the residue weight after increasing the temperature of a resin containing a layered compound from room temperature to 550° C. and thereafter subtracting the value of resin ash therefrom. In Example 1, the inorganic content can be measured to be 2.6% by subtracting 1.8% of residue weight derived from the resin from 4.4% of residue weight by TGA. Also, the ratio of an organic treatment agent in the layered compound is separately measured by TGA, and calculation using the numeral value can be employed.

The lower limit of the content of the layered compound is more preferably 0.3%, furthermore preferably 0.5%, and most preferably 0.7%. If the addition amount is less than 1.0%, the effect of the layered compound addition is slight in terms of the slight effect on the dimensional stability and mechanical characteristics. Also, the static friction coefficient may be increased and the slipping property may be worsened.

The upper limit of the addition amount is more preferably 10% or less and furthermore preferably 8% or less. If the addition amount is more than 10%, the effect on the dimensional stability and mechanical characteristics is saturated and it is not economical and the fluidity at the time of melting is lowered. Further, the surface roughness becomes unnecessarily significant, and the haze may be lowered.

Common layered compounds may be used and organically treated commercialized products preferably usable in a monomer insertion polymerization method described below are CLOISITE™ produced by Southern Clay Products Inc., SOMASIF™ and LUCENTITE™ produced by Co-op Chemical Co., Ltd., and S-Ben produced by Hojun Yoko Co., Ltd.

The layered compound is preferable to be evenly dispersed in the above-mentioned polyamide resin in the invention. The film production method can be exemplified as follows.
1. Interlayer insertion method
   1) monomer insertion polymerization method
   2) polymer insertion method
   3) lower organic molecule insertion (organic swelling) kneading method
2. In-situ method: In-situ filler formation method (sol-gel method)
3. Ultrafine particle direct dispersion method, etc.

Commercialized materials may include CRESS-ALON™ NF 3040 and NF 3020 produced by Nanopolymer Composite Corp.; NCH 1015C2 produced by Ube Industries Ltd.; and IMPERM™ 103 and IMPERM™ 105 produced by Nanocor, Inc. In order to increase the dispersibility of the layered compound for suppressing the formation of coarse matter in the layered compound contained in the polyamide resin, it is preferable to treat the layered compound with various kinds of organic treatment agents. However, to avoid an adverse effect of thermal decomposition of a treatment agent at the time of melt molding, those obtained by using a low molecular weight compound with high heat stability or by a method such as the monomer insertion polymerization method in which a low molecular weight compound is not used are preferable. With respect to the heat stability, a treated layered compound having a 5% weight loss temperature of 150° C. or higher is preferable. TGA or the like can be employed for the measurement. In the case of a compound with inferior heat stability, foams may be formed in the film or coloring may be caused and therefore, it is not preferable (reference to "Challenging nano-technological materials: Polymer nano-composites in widened application developments," Sumitomo Bakelite-Tsutsunaka Techno Co., Ltd.).

The layered compound is preferably in-plane oriented in a film for exhibiting desirable characteristics. The in-plane orientation can be confirmed by observing a cross section of the layered compound by a transmission electron microscope or a scanning electronic microscope.

(Film Formation Method)

The biaxially stretched multilayer polyamide resin film of the invention can be produced by a common method and obtained by stretching a multilayer un-stretched sheet obtained by various methods in the same conditions as those in a common case, and the thickness of each layer and the stretching conditions are controlled to give a prescribed in-plane orientation, so that a film with little boiling strain and excellent in various characteristics can be obtained. The effect of the multilayer formation is based on that the stretching stress and consequently shrinkage stress at the time of boiling are lowered by decreasing the entanglement of molecular chains in the thickness direction and as a result, bowing is lessened and the boiling strain is decreased.

Hereinafter, the system of addition of a layered inorganic compound will be described. In stretching of a resin containing a layered inorganic compound, problems in the case of stretching by employing successive biaxial stretching in lengthwise-transverse order, which is generally advantageous in terms of economy, are following three points: (1) in the stretching in the lengthwise direction (hereinafter, abbreviated as MD), crystallization proceeds due to the heat at the time of stretching and the stretching property in the transverse direction (hereinafter, abbreviated as TD) is lost after uniaxial stretching; (2) breaking occurs at the time of stretching in TD; and (3) breaking occurs at the time of thermal fixation after stretching in TD. With respect to (1), when the MD stretching conditions in which the TD stretching is possible and the MD stretching conditions in which the TD stretching is impossible are put in order, it is found that the refractive index in the width direction (refractive index in the y-axis, hereinafter, abbreviated as Ny) of a uniaxially stretched sheet after the MD stretching differs in each type of film. Concretely, it is found that Ny of a uniaxially stretched sheet which is TD-stretchable becomes low after the MD stretching. In contrast, Ny of a uniaxially stretched sheet which is not TD-stretchable (that is, whitened or broken at the time of TD stretching) is scarcely changed or not at all changed after the MD stretching. It is found that in stretching of a common polyamide resin, Ny after the MD stretching becomes low simultaneously with occurrence of neck-in in the width direction at the time of the MD stretching. On the other hand, in the case a layered compound is added thereto, neck-in occurs, but Ny tends to be difficult to be low due to the interaction of the layered compound and polyamide resin molecules. The phenomenon is supposedly attributed to as follows: since the molecular chains of a film before stretching are oriented at random in the MD and TD directions, force is generated also in the TD direction at the time of stretching the molecular chains in the MD direction by the MD stretching. The force applied also in the TD direction can be released by the neck-in in the TD direction in the case of stretching of a common polyamide resin. On the other hand, in the case of the polyamide resin containing a layered compound, since the molecular chains are cramped by the presence of the layered compound, the force in the TD direction cannot be released and the molecular chains are put in the state as if they are pulled also in the TD direction. Moreover, the layered compound is rotated at the time of the MD stretching and therefore, molecules are pulled also in directions other than the MD direction. That is, the in-plane orientation is already in a high state after the MD stretching. Therefore, it is supposed that the stretching stress at the time of successively carrying out the TD stretching becomes high and breaking is caused.

As a method for solving this problem, stretching conditions in which Ny becomes small after the MD stretching are employed to make the TD stretching at a high ratio possible without causing breaking in the TD stretching successively carried out thereafter. Thus, it is made possible to produce a film of the invention on an industrial scale.

In the case Ny(A) is defined as the refractive index in the width direction before lengthwise stretching and Ny(B) is defined as the refractive index in the width direction after lengthwise stretching, Ny(A)–Ny(B) is preferably 0.001 or higher. It is more preferably 0.002 or higher and most preferably 0.003 or higher.

As a method for lowering Ny after uniaxial stretching, a method of considerably lowering the MD stretching rate can be employed. A similar effect can be produced by multi-layering an un-stretched sheet after melt extrusion. That is, the entanglement density of molecular chains is lowered in the thickness direction by multi-layering and thus the deformability of the molecular chains is improved and Ny can be lowered. As a result, an increase of in-plane orientation at the time of the MD stretching can be suppressed, and the TD stretching property can be improved. The inventors have found that the biaxial stretching property can be improved by these methods and have completed a production method with high industrial applicability and a stretched film with excellent characteristics.

(Construction of Film)

The biaxially stretched multilayer polyamide resin film of the invention can be obtained essentially by stretching an un-stretched multilayer polyamide resin sheet having 8 layers or more in total.

In the invention, the number of layers is preferably at least not less than 8 layers and more preferably not less than 16 layers. If the multilayer film is less than 8 layers, the effect of lowering the entanglement density in the thickness direction is slight and the effect of lowering the boiling strain is slight and therefore, it is not preferable. The conditions of the number of the layers is preferably not more than 10,000 layers and more preferably 5,000 layers. If the multilayer film exceeds 10,000 layers, the heat shrinkage ratio after the thermal fixation is not lowered.

The thickness of each layer before stretching is preferably 10 nm to 30 µm and more preferably 100 nm to 10 µm. If a layer is thinner than 10 nm, the heat shrinkage ratio after the thermal fixation is not lowered and therefore, it is not preferable. If a layer exceeds 30 µm, the effect of lowering the entanglement density in the thickness direction is slight, and the effect of lowering the boiling strain is slight and therefore, it is not preferable.

With respect to the biaxially stretched multilayer polyamide resin film of the invention, 80% or more layers preferably contain the same resin composition. If less than 80% of the layers do not contain the same resin composition, the effect of the shrinkage stress derived from another resin layer becomes significant, resulting a diminished effect of decreasing the shrinkage stress and a diminished effect of decreasing the boil strain and therefore, it is not preferable.

(Laminating Method)

Besides laminating different kinds of resin as employed commonly, it is possible to layer the same kind of resin. Herein, although it seems difficult to find the physical meaning of multi-layering with the same kind of resin by a method described below, in an actual system, an interface of layers does not disappear even in the case of the same resin is laminated by melt extrusion at the same temperature. Such interface exists even after stretching. The interface is the same as that of a welded line of an injection-molded product, which is difficult to eliminate. As described, even when the same type of resin is used, a multilayer state is maintained and the entanglement of molecules in the thickness direction can be suppressed and kept low. A method for confirming the existence of an interface of layers at the time of laminating the same kind of resin by melt extrusion may be a method of cooling a sample with ice or liquefied nitrogen, producing a cross section by cutting the sample with a razor or the like thereafter, immersing the obtained sample in a solvent such as acetone, and observing the cross section with a microscope.

A polyamide resin and a resin composition composing other layers based on necessity are supplied separately to respective extruders and extruded at a temperature higher than melting temperature. The melting temperature is preferably lower by 5° C. than the decomposition starting temperature. Further, in the case of using a resin containing the layered compound, to suppress cracking of the layered compound in the resin, the melting conditions and melting temperature have to be set carefully. In the case of a polyamide resin with a high molecular weight, the layered compound is cracked if melting at such a low temperature as not higher than melting point +10° C. is carried out, and the aspect ratio becomes smaller than that in the initial state. Thus, the effect of using a layered compound with a high aspect ratio is diminished, and therefore, it is preferable to carry out melting at a high temperature in a range with no problem in terms of heat stability.

A polyamide resin and a resin composition composing other layers based on necessity are laminated by various kinds of methods and a feed-block method and a multi-manifold method can be employed. In the case of the feed-block method, at the time of widening the width to the die width after laminating, if the melt viscosity difference between laminated layers and the temperature difference at the time of laminating are significant, the method results in laminating unevenness, deterioration of the appearance, and unevenness of the thickness. Therefore, the melt viscosity difference between laminated layers and the temperature difference at the time of laminating should be carefully controlled at the time of production. For suppression of occurrence of unevenness, it is preferable to control the melt viscosity at the time of extrusion by (1) lowering the temperature and (2) adding various kinds of additives such as polyfunctional epoxy compounds, isocyanate compounds, carbodiimide compounds, etc.

In the invention, promotion of orientation in the plane of the layered compound by the shear force at the time of laminating is also effective to suppress the breaking by convergence of the stress to the tip end of the layered compound at the time of stretching. As a method suitable for such a purpose, laminating by a feed block method and a static mixer method is preferable.

The melting temperature difference between respective layers at the time of laminating of the polyamide resin is 70° C. or lower, preferably 50° C. or lower, and more preferably 30° C. or lower. The melt viscosity difference of resins between layers is adjusted to be within 30 times, preferably within 20 times, and more preferably within 10 times at the estimated shear rate in a die, so that the appearance control at the time of laminating and unevenness suppression can be made possible. For the adjustment of the melt viscosity, addition of the above-mentioned polyfunctional compounds can be employed. The static mixer temperature or feed block temperature at the time of laminating is in a range of 150° C. to 330° C., preferably 170° C. to 220° C., and more preferably 180° C. to 300° C. Since the laminating state becomes better as the viscosity is higher at the time of laminating, the feed block temperature and static mixer temperature is more preferable as being lower; however if the feed block temperature and static mixer temperature is too low, the melt viscosity becomes too high and the load on the extruder becomes too high and therefore, it is not preferable. If the temperature is too high, the viscosity is too low and laminating unevenness occurs and therefore, it is not preferable.

Further, laminating is possible by a multi-manifold method and the above-mentioned problem of laminating unevenness is hardly caused. However, in the case of laminating a layer with a melt viscosity difference, there occurs a problem of a turning-around failure of the resins in the respective layers in the end parts and unevenness of the laminating ratio in the end parts in terms of productivity and also in this case, it is preferable to control the melt viscosity difference.

For the die temperature, it is the same as described above and it is in a range of 150° C. to 300° C., preferably 170° C.

to 290° C., and more preferably 180° C. to 285° C. If the die temperature becomes too low, the melt viscosity becomes too high and the surface roughening occurs to result in appearance deterioration. If the die temperature becomes too high, thermal decomposition of the resin is caused and, as described, the melt viscosity difference becomes wide and unevenness is caused and particularly, unevenness with small pitches is caused.

(Stretching Method)

For a biaxially stretched multilayer polyamide resin film of the invention, an un-stretched sheet extruded by melt extrusion from a T die can be stretched by successive biaxial stretching and simultaneous biaxial stretching. In addition, a method such as a tubular manner can be employed. However, to carry out sufficient orientation, a method using a biaxial stretching apparatus is preferable. In terms of the characteristics and economy, a preferable method is a method of stretching in the lengthwise method by a roll type stretching apparatus and thereafter stretching in the transverse direction by a tenter type stretching apparatus (successive biaxial stretching method). Further, with respect to the MD stretching, since it is preferable to lower MD orientation at the time of the MD stretching for lessening bowing, it is preferable to employ multi-step MD stretching.

It is preferable to obtain the film by stretching a substantially un-oriented polyamide resin sheet obtained by melt extrusion from a T die 2.5 to 10 times as large as the film in the lengthwise direction at a temperature equal to or higher than the glass transition temperature Tg° C. of the polyamide resin and not higher than 150° C. Next, the lengthwise stretched film is stretched 3.0 to 10 times as large at a temperature of not lower than 50° C. and not higher than 155° C. Next, the biaxially stretched polyamide resin film is thermally fixed in a temperature range of 150° C. to 250° C.

The heating crystallization temperature can be measured by increasing the temperature of a sample resin which has been quenched after melting by DSC.

In the MD stretching, if the temperature of the film is lower than the glass transition temperature Tg° C. of the polyamide, problems of breaking and unevenness of the thickness due to the oriented crystallization by stretching occurs. On the other hand, if the film temperature exceeds 150° C., breaking is caused due to the crystallization by heat. Further, the stretching ratio of the MD stretching in the invention is preferably 2.5 to 5.0 times and more preferably 2.8 to 4.5 times. If the stretching ratio of the MD stretching is less than 2.5 times, problems such as unevenness of the thickness and insufficient strength in the lengthwise direction are caused. If the stretching ratio in the MD stretching exceeds 5 times, the effect for decreasing the boiling strain is diminished and therefore, it is not preferable. The MD stretching may be one-step or multi-step process.

When the film temperature in the TD stretching is a lower than 50° C., the TD stretching property is bad and breaking occurs and unevenness of the thickness in the TD direction attributed to the neck stretching becomes significant. When the film temperature is a high temperature beyond 155° C., unevenness of the thickness becomes significant. Further, if the TD stretching ratio is less than 1.1 times, unevenness of the thickness in the TD direction becomes significant and it is not preferable and the strength in the TD direction is lowered, and the in-plane orientation becomes inferior, which results in worsening of the characteristics not only in the TD direction but also in the MD direction. The stretching ratio is therefore preferably 3 times or more. On the other hand, if the TD stretching ratio is a high ratio beyond 10 times, practical stretching is difficult. The TD stretching ratio is preferably 3.0 to 5.0 times.

The stretching ratio based on the area at the time of producing the biaxially stretched multilayer polyamide resin film of the invention is preferably in a range of 6 to 25 times and more preferably in a range of 9 to 22 times. If the stretching ratio based on the area is lower than 6 times, sufficient in-plane orientation cannot be done and the mechanical characteristics are degraded and therefore, it is not preferable. On the other hand, if the stretching ratio based on the area exceeds 25 times, the shrinkage stress becomes significant and the boiling strain cannot be diminished and therefore, it is not preferable.

With respect to the stretching temperature, stretching at a low temperature is preferable in terms of sufficient exhibition of the addition effect of the layered silicate, unevenness of thickness of the film, and Gelbo Flex resistance. A preferable condition may be stretching at a film temperature of 155° C. or lower at the time of stretching.

(Thermal Fixation)

In the case a thermal fixation temperature is a low temperature below 150° C., the thermal fixation effect of the film by heat is slight and therefore, it is improper. On the other hand, in the case of a high temperature exceeding 250° C., the appearance of the film degrades due to whitening attributed to thermal crystallization of the polyamide and the mechanical strength is decreased, and therefore, it is improper.

In addition, in the system containing the layered compound, the density increase due to crystallization in the thermal fixation after the TD stretching and the accompanying volume shrinkage are caused, and in the case of the resin containing the layered compound, the stress to be generated is remarkably high and therefore, stress is applied in the MD direction by sharp heating and it sometimes results in breaking. Therefore, as a heating method at the time of thermal fixation, it is preferable to increase the heat quantity step by step and thus generation of acute shrinkage stress is suppressed. A concrete method is exemplified as a method of gradually increasing the temperature or increasing the air blow amount toward the surrounding of the outlet from the surrounding of the inlet of a thermal fixation zone. Preferably, the air blow amount is gradually increased in terms of the thermal shrinkage ratio after stretching and thermal fixation.

Further, with respect to the relaxation treatment, taking the balance with the heat shrinkage ratio into consideration, it is preferable to determine the relaxation ratio. In the invention, since the dimensional stability with respect to humidity in the lengthwise direction is small, the relaxation ratio is preferably in a range of 0 to 5%. If the relaxation ratio exceeds 5%, the effect on decrease of the heat shrinkage ratio in the width direction is slight and therefore, it is not preferable.

(In-Plane Orientation)

After the biaxial stretching, thermal fixation, and relaxation treatment, the biaxially stretched multilayer polyamide resin film of the invention has an in-plane orientation (ΔP) of preferably 0.057 to 0.07. The in-plane orientation can be measured by measuring birefringence with a refractive index meter and carrying out calculation according to the following expression:

$$\Delta P = (Nx + Ny)/2 - Nz,$$

wherein Nx is the refractive index in the longitudinal direction; Ny is the refractive index in the width direction; and Nz is the refractive index in the thickness direction.

The in-plane orientation can be increased by increasing the biaxial stretching ratio, particularly the TD stretching ratio and if the in-plane orientation is less than 0.057, the mechanical strength such as the piercing strength of the film is lowered and therefore, it is not preferable. Further, if the in-plane orientation exceeds 0.07, the productivity is lowered and therefore, it is not preferable.

(Boiling Strain)

The boiling strain of the biaxially stretched multilayer polyamide resin film in the invention is preferably 0.1 to 2.0%. The boiling strain is caused by fixation of the end parts in relation to the shrinkage in the center part at the time of TD stretching and it is considerably notable in the end parts in the width direction of the film. If the shrinkage degree at the times of boiling treatment is lowered, the boiling strain is diminished. To lower the shrinkage degree, besides the stretching stress is lowered by multilayer formation, which is a point of the invention, the stretching conditions are also important. However, if the conditions are not considerably out of conventional conditions for stretching a polyamide resin, it can be sufficiently lowered. If the boiling strain exceeds 2.0%, curling is notable and therefore, it is not preferable.

(Film Characteristics—Haze)

The haze of the biaxially stretched multilayer polyamide resin film in the invention is preferably in a range of 1.0 to 20%. If the haze at the time of stretching is 1.0% or lower, stable production becomes difficult and therefore, it is not preferable. If haze exceeds 20%, it becomes difficult to see contents at the time of use and additionally, the design property is deteriorated and therefore, it is not preferable.

The haze of the system containing the layered compound of the invention is the total derived from the resin, the inorganic layered compound, and voids formed by separation of the resin from the inorganic layered compound surface at the time of stretching. It is preferable to decrease haze specifically derived from the voids and for that, the stretching conditions are preferably carefully set. When the MD temperature is too low, the haze is increased due to void formation and therefore, it is not preferable. Also, when the TD temperature is too high, haze increase is observed due to crystallization and therefore, it is not preferable. A preferable temperature range is as described above and it can be adjusted with reference to these facts. Further, the haze can be adjusted in accordance with the size and type of the layered compound. For example, not only use of the layered compound with a size smaller than the wavelength of visible light makes the haze small but also use of the layered compound with a refractive index close to that of the resin makes the haze small.

(Film Characteristics—Pinhole Resistance)

The biaxially stretched multilayer polyamide resin film in the invention has excellent pinhole resistance, and the number of pinholes after 1000 times Gelbo Flex test at 23° C. is preferably 0 to 30. The pinhole resistance is mainly affected by the stretching conditions and particularly, it is preferable that the temperature at the time of TD stretching is increased not so high. In the case the TD stretching property is inferior, it is sometimes required to increase the temperature. However, if the stretching temperature is increased too high beyond the low temperature crystallization temperature, partial crystallization is promoted without progression of sufficient stretching and thickness unevenness and pinholes tend to be formed easily in fine regions. Also, pinholes can easily form in the obtained film.

With respect to the TD stretching temperature, concretely, it is preferably 155° C. or lower. If the TD stretching temperature exceeds 155° C., the film tends to become brittle and the pinhole resistance is worsened.

(Film Characteristics—Equilibrium Moisture Content)

The equilibrium moisture content of the polyamide resin film in the invention is preferably in a range of 3.5 to 10%. The equilibrium moisture content of a common biaxially stretched film of a polyamide resin is about 3% and the film of the invention is preferably higher than that. Among commonly known layered compounds, most commonly used montmorillonite and smectite are generally used as a thickener for increasing the viscosity of an aqueous solution. As being assumed from that, they have characteristics of taking water in inter-layers, being swollen easily, and absorbing a large quantity of water. If these compounds are merely added to a resin, montmorillonite absorbs a large quantity of water. Therefore, the equilibrium moisture content in the resin composition becomes higher and the characteristics become highly moisture-dependent. According to the invention, since the layered compound is highly in-plane orientated, and also, even if the addition amount is so high as to give the equilibrium moisture content of 3.5% or higher, the moisture-dependency of the characteristics can be suppressed by biaxial stretching of the matrix polyamide resin at a high ratio and further carrying out orientation crystallization. If the equilibrium moisture content is less than 3.5%, the effect of the layered compound addition is slight and if it exceeds 10%, the addition amount is excess and preferable characteristics cannot be obtained.

(Film Characteristics—Gas Barrier Property)

In the invention, the multilayer film containing the layered compound is excellent in the barrier property since the layered compound is oriented in the plane. It is preferable that the oxygen permeability in conversion into 15 μm is in a range of 5 to 20 $cc/m^2/day/atm$. The upper limit of the oxygen permeability is preferably 19 $cc/m^2/day/atm$ or lower and more preferably 18 $cc/m^2/day/atm$ or lower. The oxygen barrier property depends on the in-plane orientation degree of the layered compound in the polyamide resin and the addition amount. A preferable addition amount of the layered compound in terms of the oxygen barrier property is in a range of 0.3 to 10 wt. % with respect to the entire film. If the addition amount is less than 0.3 wt. %, the effect of the barrier property is slight. If the addition amount exceeds 10 wt. %, the balance with the characteristics such as the boiling strain is worsened and therefore, it is not preferable. Further, aiming to further increase the gas barrier property, it is preferable to add a resin with a high barrier property and to laminate a resin layer with a high barrier property. Examples of the resin with a high barrier property are m-xylylenediamine type nylon (MXD6), polyvinyl alcohol, polyglycolic acid, etc. The addition amount and the laminating amount of these compounds is preferably 1 to 20%. If it is less than 1%, the effect of improving the barrier property is slight and if it exceeds 20%, the added barrier resin and the stretching property cannot be well balanced and therefore, it is not preferable.

(Film Characteristics—Heat Shrinkage Ratio)

The biaxially stretched multilayer polyamide resin film of the invention is preferable to have a heat shrinkage ratio at 160° C. for 10 minutes in a range of −0.5 to 1.5% in both the lengthwise direction and transverse direction. In order to make the heat shrinkage ratio close to zero, it is preferable to optimize the stretching conditions, thermal fixation condition, and the thickness of the layer. For improvement of the stretching property, it is advantageous that the thickness of each layer is thin. However, if the layer is too thin, the heat shrinkage ratio cannot be lowered by thermal fixation and therefore, the layer structure is preferable to be determined in accordance with the aimed heat shrinkage ratio. To simultaneously provide both the desired heat shrinkage ratio and stretching property, the thickness of each layer before stretching is preferably in a range of 1 to 30 μm, and more preferably in a range of 2 to 20 μm. The lower limit of the heat shrinkage ratio is more preferably 0% or higher and even more preferably 0.1% or higher. The upper limit is preferably 1.5% or lower and more preferably 1.3% or lower.

The biaxially stretched multilayer polyamide resin film of the invention may be subjected to corona treatment, coating treatment, or flame treatment to improve the adhesiveness and wettability in accordance with use. With respect to the coating treatment, an in-line coating method of stretching a coated product during film formation is preferably used. The biaxially stretched multilayer polyamide resin film of the invention is generally further processed by printing, deposition, lamination, etc. in accordance with the desired end use.

The biaxially stretched polyamide resin film of the invention may optionally contain a hydrolysis resistant improver, an antioxidant, a coloring agent (a pigment, a dye), an antistatic agent, a conductive agent, a flame retardant, a reinforcing agent, a filler, an inorganic lubricant, an organic lubricant, a nucleating agent, a release agent, a plasticizer, an adhesive aid, a pressure-sensitive adhesive, etc.

EXAMPLES

Next, the invention will be described more in detail with reference to Examples; however the invention is not to be considered as being limited by these Examples, but is only limited by the scope of the appended claims. Measurement methods employed in the invention will be described below.

(1) Haze

Haze was measured at different 3 points of each sample by using a haze meter (NDH 2000, produced by Nippon Denshoku Industries Co., Ltd.) according to a method of JIS K7105 and the average value was employed.

(2) Measurement of Glass Transition Temperature (Tg) and Measurement of Low Temperature Crystallization Temperature (Tc)

An un-oriented polyamide resin sheet was frozen in liquefied nitrogen and after thawing under reduced pressure, these temperatures were measured at a heating rate of 20° C./min by using DSC produced by Seiko Instruments Inc.

(3) Addition Amount of Inorganic Material Including Layered Compound (Residue Weight)

The weight of residue was measured by using TGA manufactured by TA Instruments after 0.1 g of each sample was heated to 500° C. at a heating rate of 20° C./min under nitrogen flow.

(4) Surface Roughness (Sa)

Small pieces of film were cut off from 3 arbitrary parts of each film and dust or the like was carefully removed by a static elimination blower. The heat adhesion layer surface of each piece was measured by a non-contact three-dimensional shape measurement apparatus (Micromap 557 manufactured by Micromap Corp.). For the optical system, a Millot type two beam interference object lens (10 magnification) and a zoom lens (Body Tube; 0.5 magnification) were used. Light was received by a ⅔ inch CCD camera using a light source of 5600 angstrom. The measurement was carried out in WAVE mode, and the visual field of 1619 μm×1232 μm was processed as a digital image of 640×480 pixels. The image analysis was carried out using an analysis software (Micromap 123, version 4.0) by detrending in a linear function mode. Accordingly, arithmetic average surface roughness for 5 visible fields of each front face and each rear face of three samples (total 30 visible fields) were measured and the average value was defined as the surface roughness (Sa).

(5) Static Friction Coefficient

The static friction coefficient was measured by a friction coefficient test method described in JIS K7125. Ten samples were cut off from 5 arbitrary points of each film, and both front and rear faces of the film were set face to face for measurement. The normal stress calculated by the load applied to the sliding specimen was set to be 0.5 N/cm$^2$, and the average value of 5 times measurement results was defined as the static friction coefficient. The measurement environments were 23° C. and 65% RH.

(6) Gloss

As the gloss, 85-degree mirror face gloss was measured using a specimen of a size of 100×100 mm according to JIS K8741 with a gloss meter (gloss meter model 1001 DP, produced by Nippon Denshoku Industries Co., Ltd.). The value was the average value of front and rear faces.

(7) Mechanical Characteristic (Elastic Modulus)

The elastic modulus was measured according to JIS K 7113. Specimens with a width of 10 mm and a length of 100 mm in the width direction and the longitudinal direction were cut off from each film by a razor and used. After the specimens were left in an atmosphere of 23° C. and 35% RH for 12 hours, the measurement was carried out in an atmosphere of 23° C. and 35% RH and under conditions of chuck interval of 40 mm and tensile speed of 200 mm/min. The average value of 5 times measurement results was employed. Autograph AG 5000 A manufactured by Shimadzu Corp. was used as a measurement apparatus. The high temperature MD elastic modulus was measured in an oven heated to a prescribed temperature under conditions of chuck interval of 40 mm and tensile speed of 200 mm/min. The average value of 5 times measurement results was employed.

(8) Dynamic Viscoelasticity Test

The dynamic viscoelasticity measurement was determined by an apparatus produced by I.T. Research Co., Ltd. under conditions of measurement length of 30 mm, displacement of 0.25%, frequency of 10 Hz, and a measurement environment temperature of 23° C. Each sample was cut off in a size of length 40 mm×width 5 mm in parallel to the width direction of each film. The average value of two points was employed. Calculation of tan δ was carried out according to the following expression:

$$\tan δ = (\text{imaginary number of complex elastic modulus})/(\text{real number of complex elastic modulus}).$$

(9) Pinhole Resistance (Flex Resistant Fatigue Test)

Flex resistant fatigue property was measured by the following method using a Gelbo Flex tester produced by Rigaku Kogyo Co., Ltd. At first, each obtained film sample was attached in cylindrical form to a fixed head with a diameter of 8.89 cm (3.5 inch) and a movable head with the same diameter and arranged in parallel at an interval of 17.78 cm (7 inch) from the fixed head. The movement of the movable head was controlled by a shaft installed in the center of the movable head. At first, while being twisted at 440°, the movable head was moved closer by 8.89 cm (3.5 inch) to the fixed head and next further moved closer by 6.35 cm (2.5 inch) by horizontal movement and thereafter, the movable head was turned back to the former state by the inversion movement. This cycle was repeated 1000 times at 23° C., 60% RH, and a speed of 40 times/min. After repeating the cycle 1000 times, the number of pinholes was measured. The measurement of the number was carried out by the following method. The film was put on a filter paper (No. 50, Advantec) and four corners were fixed by SELLOTAPE™. Ink (produced by Pilot Corporation (product No. INK-350-Blue) diluted fivefold with pure water) was applied to the test film and spread on one face by a rubber roller. After excess ink was wiped off, the test film was removed and the number of points of the ink on the filter paper was counted.

(10) Mechanical Characteristics (Maximum Point Stress, Breaking Elongation)

The maximum stress point and breaking elongation were measured according to JIS K 7113. Specimens with a width of 10 mm and a length of 100 mm in the width direction and the longitudinal direction were cut off from each film by a razor and used. After the specimens were left in an atmosphere of 23° C. and 35% RH for 12 hours, the measurement was carried out in an atmosphere of 23° C. and 35% RH and under conditions of chuck interval of 40 mm and tensile speed of 200 mm/min. The average value of 5 times measurement results was employed. Autograph AG 5000 A manufactured by Shimadzu Corp. was used as a measurement apparatus.

(11) Relative Viscosity

The relative viscosity was measured at 20° C. after 0.25 g of nylon resin was dissolved in 25 ml of 96% sulfuric acid solution.

(12) In-Plane Orientation of Layered Compound

With respect to a film obtained by stretching a nylon 6 resin in which montmorillonite was dispersed, the in-plane orientation of montmorillonite was measured. In the case of compounds other than montmorillonite, measurement could be carried out in the same manner. RINT 2500 Cu-Kα produced by Rigaku Corporation was used as the apparatus and the half width of the peak of (060) montmorillonite was measured by x-ray diffractometry with output of 40 kV and 200 mA. The in-plane orientation of the inorganic layered compound was calculated from the half width according to in-plane orientation=(180−half width)/180.

Herein, the half width of the peak of (060) of montmorillonite was measured by the following method: (1) x-ray was led in the width (TD) direction to the film sample; (2) the sample was fixed at a position of θ=31.4° to the incident x-ray and the detector was fixed at a position of 2θ=62.8°; (3) x-ray diffraction intensity was measured by in-plane rotating (β-rotation) the sample stage form 0 to 360'; (4) the portion formed by removing the surrounding of ±60° of the peak top from the obtained x-ray diffraction intensity plot (see FIGURE, which is an x-ray diffraction intensity plot of the film prepared in Example 8) was collinearly approximated by a least-square method to obtain a base line; and (5) the peak width at the half height from the base line measured in (4) to the peak top was defined as the half width.

(13) Observation of the Orientation State of Layered Compound in Film

Each sample was prepared by the following method and observed by a transmission electron microscope. At first, each sample film was embedded in an epoxy resin. The epoxy resin employed was obtained by mixing Luveak 812, Luveak NMA (produced by Nacalai Tesque, Inc.), and DMP 30 (produced by TAAB Laboratories Equipment Ltd.) at a weight ratio of 100:89:3. After the sample film was embedded in the epoxy resin, it was left for 16 hours in an oven controlled at a temperature of 60° C. to harden the epoxy resin and obtain an embedded block.

The embedded block was attached to Ultra-cut N produced by Nissei Sangyo Corporation and ultrathin specimens were produced. At first, each specimen was trimmed until the cross section of the portion of the film to be observed was exposed to the resin surface by a glass knife. Next, each ultra-thin specimen was cut off by a diamond knife (Sumi Knife SK2045, produced by Sumitomo Electric Industries Ltd.). After the cut off ultra-thin specimen was recovered on a mesh, thin carbon vapor deposition was carried out. An electron microscope observation was carried out using JEM-2010 produced by JEOL Ltd. under condition of accelerating voltage of 200 kV. The image of the cross section of the film obtained by the electron microscopy was recorded on an imaging plate (FDLUR-V, produced by Fujifilm Corporation). From the image, 50 layered compounds were extracted at random and the inclination of the respective compounds was evaluated.

In the case the inclination dispersion of the layered compound was within an angle of 20° or less, it was defined the layered compound was in-plane orientated. Those in-plane orientated were marked with ○ and those which were not in-plane orientated were marked with x.

(14) Thickness and Number of Total Layers in Film

Each film was cooled by liquefied nitrogen and cut off in the width direction of the cast film or stretched film by a Feather blade to obtain a cross section immediately after taken out. The cross section was observed by an optical microscope (BX 60, produced by Olympus Corporation) and the thickness of a layer was calculated by dividing the thickness of 5 to 20 layers by the number of the layers. The number of the total layers was measured by the same method.

In the case the interface of layers was difficult to distinguish in the above-mentioned method, each sample was produced by the following method and observed by a transmission electron microscope. At first, each sample film was embedded in an epoxy resin. The epoxy resin employed was obtained by mixing Luveak 812, Luveak NMA (produced by Nacalai Tesque, Inc.), and DMP 30 (produced by TAAB Laboratories Equipment Ltd) at a weight ratio of 100:89:3. After the sample film was embedded in the epoxy resin, it was left for 16 hours in an oven controlled at a temperature of 60° C. to harden the epoxy resin and obtain an embedded block. The embedded block was attached to Ultra-cut N produced by Nissei Sangyo Corporation and ultrathin specimens were produced. At first, each specimen was trimmed until the cross section of the portion of the film to be observed was exposed to the resin surface by a glass knife. Next, each ultra-thin specimen was cut off by a diamond knife (Sumi Knife SK2045, produced by Sumitomo Electric Industries Ltd.). After the cut off ultra-thin specimen was recovered on a mesh, thin carbon vapor deposition was carried out.

An electron microscope observation was carried out using JEM-2010 produced by JEOL Ltd. under condition of accelerating voltage of 200 kV. The image of the cross section of the film obtained by the electron microscopy was recorded on an imaging plate (FDLUR-V, produced by Fujifilm Corporation). From the image, the thickness of the layer having the maximum thickness thicker than the interval between interfaces of the respective layers was measured.

(15) Oxygen Permeability (OTR)

Oxygen permeability was measured at a humidity of 65% and a temperature of 23° C. using an oxygen permeability measurement apparatus (OX-TRAN 10/50A, produced by Modern Controls, Inc.). The obtained result was converted into a value with a thickness of 15 μm and the value was defined as the oxygen permeability (OTR, cc/m$^2$/day/atm). The conversion into the value with a thickness of 15 μm was done according to the following:

(*OTR* converted into value with a thickness of 15 μm)=(measured *OTR*)×(film thickness,μm)/15 (μm).

(16) Piercing Strength

According to regulation of Food Sanitation Law, each sample was fixed in a cylindrical tool and a needle with a diameter of 1.0 mm and a semicircular tip end shape with a radius of 0.5 mm was thrust into the sample at a speed of 50 mm/min and the maximum load (N) until the needle penetrated the sample was measured.

(17) Equilibrium Moisture Content

Each sample with a size of 10 cm square was dried at 60° C. for 24 hours in a vacuum, and the weight (a) was measured. Thereafter, the sample was left in an environment of 40° C. and 90% RH for 12 hours, and the weight (b) was measured. The equilibrium moisture content was calculated according the following expression.

Equilibrium moisture content(%)=(b−a)/a×100.

(18) Cleavage Resistance

Each film after biaxial stretching was cut out by a cutter, and SELLOTAPE™ was stuck to the end face and left at room temperature for 24 hours. Thereafter, the tape was peeled at an angle of 90° and existence of cleavage was confirmed.

(19) Boiling Strain

Each sample was cut in a square shape with each side of 21 cm and each sample was left in environments of 23° C. and 65% RH for 2 hours or longer. The length of two diagonal lines of each sample was measured and defined as the length before treatment. Next, the sample was heated in boiling water for 30 minutes and taken out and thereafter wiped to remove the water adhering to the surface, dried by air blow, and left in an environment of 23° C. and 65% RH for 2 hours or longer. Then, the length of two diagonal lines of the sample was measured again and defined as the length after treatment. The shrinkage ratios in boiling water in 45° direction and in 135° direction were calculated from the measured values according to the following expression and the absolute value (%) of the difference was defined as the boiling strain. The average value of hygroscopic difference of each sample was calculated.

Shrinkage ratio in boiling water=[(length before treatment−length after treatment)/length before treatment]×100(%)

(20) Heat Shrinkage Ratio

The measurement was carried out according to a dimensional change test method described in JIS C2318, except that the test temperature was adjusted at 160° C. and the heating time was adjusted to 10 minutes.

At first, the first invention will be described with reference to Examples and Comparative Examples.

Example 1

After pellets of a nylon 6 resin (T-800, produced by Toyobo Co., Ltd.: relative viscosity RV=2.5, containing no lubricant) and pellets of a nylon 6 resin containing montmorillonite as a layered compound dispersed evenly therein (NF 3040, produced by Nanopolymer Composite Corp.; addition amount of the layered compound: 4% (inorganic material 2.6%)) were respectively vacuum-dried overnight at 100° C., they were blended at a weight ratio of 1/1. Next, the blended pellets were supplied to two extruders. After the pellets melted at 270° C. and the same kind resin was laminated by a static mixer having 16 elements at 275° C., and the laminate was extruded in a sheet-like form out of a T die heated at 270° C. to cooling rolls adjusted at 20° C. Next, the extruded sheet was cooled and hardened to obtain an un-stretched multilayer sheet. The ratio of the discharge amounts of the two extruders was controlled to be 1:1. The thickness of the un-stretched sheet was 180 μm and the thickness of each layer in the center part in the width direction was about 1 μm. Tg of the sheet was 35° C. and the melting point was 225° C. The sheet was at first preheated at 65° C., stretched 2.5 times by MD stretching at a stretching temperature of 65° C. and a deformation speed of 16000%/min. Next, the sheet was continuously led to a tenter and stretched 3.8 times by TD stretching in a preheat zone at 65° C. and a stretching zone at 135° C., subjected to thermal fixation at 210 and 5% transverse relaxation treatment. Thereafter, the sheet was cooled, and both rim parts were cut and removed to obtain a biaxially stretched polyamide resin film with a thickness of 12 μm. The film had a width of 40 cm and a length of 1000 m and was rolled around a paper tube. The physical properties of the film are shown in Table 1.

Examples 2 to 5, Example 7, Comparative Examples 1, 2, and Comparative Examples 4 to 6

The samples were produced under the conditions described in Table 1. The film properties of Examples are shown in Table 1, and the film properties of Comparative Examples are shown in Table 2.

Example 3 and Comparative Example 1 were made to be a monolayer without using a static mixer. In Examples 4 and 5, TD stretching was carried out after two-step MD stretching.

Example 6

After pellets of nylon 6 resin containing montmorillonite as a layered compound dispersed evenly therein (NF 3040, produced by Nanopolymer Composite Corp.; addition amount of the layered compound: 4% (inorganic material 2.6%)) and organically treated montmorillonite powder (CLOISITE™ 30B, produced by Southern Clay Products Inc.) were respectively vacuum-dried overnight at 100° C., they were blended at a weight ratio to give the addition amount of the inorganic layered compound of 8%. Thereafter, the blended pellets were supplied to two extruders and melted and mixed at 275° C. The obtained resin pellets were again dried in a vacuum drier at 100° C. for 24 hours. The resin was supplied to an extruder and melted at 275° C. and the same kind of resin was laminated by a static mixer having 16 elements at 275° C., and the laminate was extruded in a sheet-like form out of a T die heated at 270° C. to cooling rolls adjusted at 20° C. and then cooled and hardened to obtain an un-stretched multilayer sheet. The thickness of the un-stretched sheet was 180 μm, and the thickness of each layer in the center part in the width direction was about 1 μm. Tg of the sheet was 35° C., and the melting point was 225° C. The sheet was at first preheated at 45° C., stretched 3.2 times by MD stretching by rolls with a surface temperature of 85° C. and a deformation speed of 4500%/min. Next, the sheet was continuously led to a tenter and stretched 3.8 times by TD stretching in a preheat zone at 110° C. and a stretching zone at 130° C., subjected to thermal fixation at 210° C. and 5% transverse relaxation treatment. Next, the sheet was cooled, and both rim parts were cut and removed to obtain a biaxially stretched polyamide resin film with a thickness of 15 μm. The physical properties of the film are shown in Table 1.

Comparative Example 3

After pellets of a nylon 6 resin (T-800, produced by Toyobo Co., Ltd.: relative viscosity RV=2.5, containing no lubricant) and silica particles as a lubricant (SILYSIA™ 310, produced by Fuji Silysia Chemical Ltd.) were respectively vacuum-dried overnight at 100° C., they were mixed by an extruder at 270° C. and melted and mixed at 275 to give the lubricant concentration of 1000 ppm. The obtained resin pellets were again dried in a vacuum drier at 100° C. for 24 hours. The resin was supplied to an extruder and melted at 275° C. and the same kind of resin was laminated by a static mixer having 16 elements at 275° C. and the laminate was extruded in a sheet-like form out of a T die heated at 270° C. to cooling rolls adjusted at 20° C. and then cooled and hardened to obtain an un-stretched multilayer sheet. The thickness of the un-stretched sheet was 180 μm, and the thickness of each layer in the center part in the width direction was about 1 μm.Tg of the sheet was 35° C., and the melting point was 225° C. The sheet was at first preheated at 45° C., stretched 3.2 times by MD stretching by rolls with a surface temperature of 60° C. and a deformation speed of 16000%/min. Next, the sheet was continuously led to a tenter and stretched 3.8 times by TD stretching in a preheat zone at 110° C. and a stretching zone at 130° C., subjected to thermal fixation at 210° C. and 5% transverse relaxation treatment. Next, the sheet was cooled, and both rim parts were cut and removed to obtain a biaxially stretched polyamide resin film with a thickness of 15 μm. The physical properties of the film are shown in Table 2.

TABLE 1

|  |  | Examples | | | | | | |
| --- | --- | --- | --- | --- | --- | --- | --- | --- |
|  |  | 1 | 2 | 3 | 4 | 5 | 6 | 7 |
| Cast | Resin 1 | NF3040/T800 | NF3040 | NF3040 | NF3040 | NF3040 | NF3040 + Cloisite | NF3040 + T800 |
|  | Melting temperature (° C.) | 270 | 270 | 275 | 285 | 290 | 275 | 270 |
|  | Resin 2 | NF3040/T800 | NF3040 | — | NF3040 | NF3040 | NF3040 + Cloisite | NF3040 + T800 |
|  | Melting temperature (° C.) | 270 | 270 | — | 285 | 290 | 275 | 270 |
|  | Layer ratio | 50/50 | 50/50 | — | 50/50 | 45/55 | 50/50 | 50/50 |
|  | Laminate portion temperature (° C.) | 270 | 275 | 275 | 275 | 280 | 275 | 270 |
|  | Adding amount of layerd compound (%) | 2 | 4 | 4 | 4 | 4 | 8 | 1.5 |
|  | Content of inorganic material (%) | 1.3 | 2.6 | 2.6 | 2.6 | 2.6 | 5.2 | 1.0 |
|  | Number of layers | 100 or more | 100 or more | 1 | 100 or more | 100 or more | 100 or more | 100 or more |
| MD streching | Preheating temperature (° C.) | 65 | 45 | 40 | 45 | 45 | 45 | 45 |
|  | Streching temperature (° C.) | 65 | 85 | 70 | 80 | 80 | 85 | 75 |
|  | Ratio (times) | 2.5 | 3.2 | 3.2 | 2.0, 2.0 | 1.5, 2.3 | 3.2 | 3.2 |
|  | Deformation speed (%/min) | 16000 | 4500 | 900 | 1950, 1950 | 1200, 2700 | 4500 | 4500 |
|  | Ny(A)-Ny(B) | 0.006 | 0.003 | 0.002 | 0.004 | 0.002 | 0.003 | 0.003 |
| TD streching | Preheating temperature (° C.) | 65 | 110 | 110 | 110 | 110 | 110 | 110 |
|  | Streching temperature (° C.) | 135 | 130 | 130 | 135 | 135 | 130 | 100 |
|  | Ratio (times) | 3.8 | 3.8 | 3.8 | 3 | 4 | 3.8 | 3.8 |
| Thermal fixation | Temperature (° C.) | 210 | 210 | 210 | 210 | 210 | 210 | 210 |
| Relaxation | Temperature (° C.) | 210 | 210 | 210 | 210 | 210 | 210 | 210 |
|  | Relaxation ratio (%) | 3 | 5 | 5 | 5 | 5 | 5 | 5 |
| Properties | Thickness (μm) | 12 | 20 | 20 | 15 | 13 | 15 | 15 |
|  | The in-plane orientation state of layered compound | ○ | ○ | ○ | ○ | ○ | ○ | ○ |
|  | Haze (%) | 5 | 8 | 13 | 9 | 8 | 17 | 1.5 |
|  | MD elastic modulus (GPa) | 2.9 | 2.5 | 1.9 | 2.1 | 1.9 | 3.4 | 1.8 |
|  | Surface roughness (Sa) | 0.0154 | 0.0128 | 0.03 | 0.025 | 0.024 | 0.097 | 0.032 |
|  | Static friction coefficient μs | 0.93 | 0.79 | 0.78 | 0.82 | 0.80 | 0.40 | 0.95 |
|  | The number of pinholes | 9 | 2 | 12 | 1 | 1 | 16 | 20 |
|  | 85-degree gloss | 82 | 78 | 80 | 65 | 69 | 64 | 74 |
|  | In-plane orientation of layered compound | 0.73 | 0.82 | 0.8 | 0.79 | 0.84 | 0.75 | 0.71 |

Two numerical values described in one cell indicate the data on the first and second steps of the two-steps lengthwise strecthing in this order

TABLE 2

|  |  | Comparative Examples | | | | | |
| --- | --- | --- | --- | --- | --- | --- | --- |
|  |  | 1 | 2 | 3 | 4 | 5 | 6 |
| Cast | Resin 1 | NF3040 | NF3040 + T800 | T800 | T800 | NF3040 + T800 | NF3040 |
|  | Melting temperature (° C.) | 275 | 270 | 270 | 270 | 275 | 280 |
|  | Resin 2 | — | NF3040 + T800 | T800 | T800 | NF3040 + T800 | NF3040 |
|  | Melting temperature (° C.) | — | 270 | 270 | 270 | 275 | 280 |
|  | Layer ratio | — | 50/50 | 50/50 | 50/50 | 50/50 | 50/50 |
|  | Laminate portion temperature (° C.) | 270 | 270 | 270 | 270 | 270 | 285 |

TABLE 2-continued

|  |  | Comparative Examples | | | | | |
|---|---|---|---|---|---|---|---|
|  |  | 1 | 2 | 3 | 4 | 5 | 6 |
|  | Adding amount of layerd compound (%) | 4 | 0.5 | 0 | 0 | 2 | 4 |
|  | Content of inorganic material (%) | 2.6 | 0.8 | 0.1 | 0 | 1.3 | 2.6 |
|  | Number of layers | 1 | 100 or more | 100 or more | 100 or more | 100 or more | 100 or more |
| MD streching | Preheating temperature (° C.) | 45 | 60 | 60 | 60 | 40 | 60 |
|  | Streching temperature (° C.) | 80 | 60 | 60 | 60 | 70 | 80 |
|  | Ratio (times) | 3.2 | 3.2 | 3.2 | 2 | 2.5 | 3.2 |
|  | Deformation speed (%/min) | 4500 | 16000 | 16000 | 4500 | 4500 | 4500 |
|  | Ny(A)-Ny(B) | 0.0008 | 0.008 | 0.008 | 0.008 | 0.0057 | 0.008 |
| TD streching | Preheating temperature (° C.) | 110 | 60 | 60 | 60 | 65 | 60 |
|  | Streching temperature (° C.) | 130 | 135 | 135 | 135 | 135 | 175 |
|  | Ratio (times) | 3.8 | 3.8 | 3.8 | 4 | 2 | 3.8 |
| Thermal fixation | Temperature (° C.) | 210 | 210 | 210 | 210 | 210 | 210 |
| Relaxation | Temperature (° C.) | 210 | 210 | 210 | 210 | 210 | 210 |
|  | Relaxation ratio (%) | 5 | 3 | 3 | 3 | 3 | 3 |
| Properties | Thickness (μm) | 20 | 15 | 15 | 13 | 15 | 14 |
|  | The in-plane orientation state of layered compound | ○ | ○ | — | — | X | ○ |
|  | Haze (%) | 25 | 5 | 12 | 9 | 6 | 39 |
|  | MD elastic modulus (GPa) | 2.6 | 1.6 | 1.5 | 1.9 | 1.2 | 2.2 |
|  | Surface roughness (Sa) | 0.06 | 0.02 | 0.12 | 0.05 | 0.03 | 0.05 |
|  | Static friction coefficient μs | 0.9 | 1.5 | 0.8 | 1.9 | 1.1 | 1.3 |
|  | The number of pinholes | 18 | 5 | 2 | 12 | 17 | 35 |
|  | 85-degree gloss | 51 | 70 | 49 | 44 | 54 | 45 |
|  | In-plane orientation of layered compound | 0.55 | 0.4 | — | — | 0.2 | 0.52 |

Comparative Example 7

After pellets of nylon 6 resin containing montmorillonite as a layered compound dispersed evenly therein (NF 3040, produced by Nanopolymer Composite Corp.; addition amount of the layered compound: 4% (inorganic material 2.6%)) were vacuum-dried overnight at 100° C., the same resin was supplied to two extruders, melted at 280° C., and laminated by a static mixer having 16 elements heated at 280° C. The laminate was extruded in a sheet-like form out of a T die heated at 275° C. to cooling rolls adjusted at 20° C. and then cooled and hardened to obtain an un-stretched multilayer sheet. The ratio of the discharge amounts of the two extruders was controlled to be 1:1. The thickness of the un-stretched sheet was 150 μm, the thickness of each layer measured in a cross section was about 1 μm, and the number of the layers was 100 or higher. The Tg of the sheet was 35° C., and the melting point was 225° C. The sheet was at first preheated at 40° C., stretched 2 times by vertical stretching at a stretching temperature of 60° C. and a deformation speed of 2300%/min, and successively the sheet was continuously led to a tenter and stretched 2 times by transverse stretching at a preheating temperature of 60° C. and stretching temperature of 70° C. Next, the film was subjected to thermal fixation at 210° C. and 5% transverse relaxation treatment, and thereafter, cooled. The un-stretched part in the width direction was cut and removed to obtain a biaxially stretched polyamide resin film with a thickness of 30 μm. The film had a width of 40 cm and a length of 1000 m and was rolled around a paper tube. The physical properties at that time are shown in Table 4.

Example 8

An un-stretched sheet was obtained in the same manner as Comparative Example 7. Next, the un-stretched sheet was preheated by rolls with a surface temperature of 45° C. and stretched 3.2 times by lengthwise stretching using rolls with a surface temperature of 80° C. and a deformation speed of 4500%/min. Next, the sheet was continuously led to a tenter and stretched 3.8 times by transverse stretching at a preheating temperature of 110° C. and a stretching temperature of 135° C. and subjected to thermal fixation at 210° C. and 5% transverse relaxation treatment. Thereafter, the film was cooled, and both rim parts were cut and removed to obtain a biaxially stretched polyamide resin film with a thickness of 12 μm. The film had a width of 40 cm and a length of 1000 m and was rolled around a paper tube. The physical properties at that time are shown in Table 3. The in-plane orientation of the layered compound was improved from 0.2, which was the in-plane orientation of Comparative Example 7, to 0.82, and the OTR value in conversion into 15 μm was remarkably lowered from 17 cc to 12 cc.

Example 9

After pellets of nylon 6 resin containing montmorillonite as a layered compound dispersed evenly therein (NF 3040, produced by Nanopolymer Composite Corp.; addition amount of the layered compound: 4% (inorganic material 2.6%)) were vacuum-dried overnight at 100° C., the pellets were supplied to an extruder and melted at 290° C. After the resin temperature was adjusted at 270° in a melt-line, the melted resin was introduced into a static mixer with 16 elements heated at inlet part of 270° C. and at center to outlet part of 285° C. and the same kind of resin was laminated. The laminate was extruded in a sheet-like form out of a T die heated at 280° C. to cooling rolls adjusted at 20° C. and then cooled and hardened to produce an un-stretched multilayer sheet. The thickness of the un-stretched sheet was 200 μm, and the thickness of each layer in the center part in the width direction was about 1 μm. The Tg of the sheet was 40° C. The sheet was at first preheated at 45° C. and stretched by two-step stretching at a stretching temperature of 80° C. The first MD stretching was carried out at 1950%/min 2 times and the second MD stretching was carried out also at 1950%/min 2 times. Next, the sheet was continuously led to a tenter and stretched 4 times by TD stretching in a preheat zone at 110° C. and a stretching zone at 130° C., subjected to thermal fixation at 210 to 215° C. and 5% transverse relaxation treatment. Thereafter, the film was cooled, and both rim parts were cut and removed to obtain a biaxially stretched polyamide resin film with a thickness of 15 μm. The film had a width of 40 cm and a length of 1000 m and was rolled around a paper tube. The obtained film had excellent cleavage resistance. The physical properties of the film are shown in Table 3. The in-plane orientation of the layered compound was improved from 0.2, which was the in-plane orientation of Comparative Example 7, to 0.89, and the OTR value in conversion into 15 μm was remarkably lowered from 17 cc to 10 cc.

Examples 10 to 12

The samples were produced under the conditions described in Table 3. The film properties are shown in Table 3. Along with improvement of the in-plane orientation of the layered compound, the OTR value in conversion into 15 μm was improved to be around 12 cc.

Comparative Example 8

Pellets of nylon 6 resin containing montmorillonite as a layered compound dispersed evenly therein (NF 3040, produced by Nanopolymer Composite Corp.; addition amount of the layered compound: 4% (inorganic material 2.6%)) were vacuum-dried overnight at 100° C. Film formation was carried out using a monolayer inflation film formation apparatus. The pellets were supplied to an extruder and melted at 290° C. Next, the film was extruded out of a circular die heated at 280° C. and cooled with air and simultaneously, the discharge amount, rolling speed, and tube diameter were adjusted so as to control the stretching ratio of 4 times on the basis of the area. The center part of the tube was cut to obtain a biaxially stretched polyamide resin film with a thickness of 20 μm. The physical properties at that time are shown in Table 4.

Comparative Example 9

After pellets of poly(ethylene terephthalate) resin (RE 553, produced by Toyobo Co., Ltd.) and a powder of montmorillonite (CLOISITE™ 10A, produced by Southern Clay Products Inc.) as a layered compound were respectively vacuum-dried overnight at 100° C., they were dry-blended at a weight ratio of 85/15 and supplied to two extruders and melted and mixed at 295° C. The obtained resin pellets were again dried in a vacuum drier at 100° C. for 24 hours. The resin was supplied to an extruder and melted at 295° C. and the same kind of resin was laminated by a static mixer having 16 elements at 285° C. The laminate was extruded in a sheet-like form out of a T die heated at 285° C. to cooling rolls adjusted at 20° C. and then cooled and hardened to obtain an un-stretched multilayer sheet. The thickness of the un-stretched sheet was 100 μm, and the thickness of each layer in the center part in the width direction was about 1 μm. The Tg of the sheet was 65° C. The sheet was at first preheated at 90° C., stretched 2 times by MD stretching by rolls with a surface temperature of 110° C. and a deformation speed of 2500%/min. Next, the sheet was continuously led to a tenter and stretched 2 times by TD stretching in a preheat zone at 90° C. and a stretching zone at 100° C., subjected to thermal fixation at 230° C. and 5% transverse relaxation treatment. Thereafter, the film was cooled, and both rim parts were cut and removed to obtain a biaxially stretched poly(ethylene terephthalate) resin film with a thickness of 25 μm. The film had a width of 40 cm and a length of 1000 m and was rolled around a paper tube. The physical properties of the film are shown in Table 4.

Reference Example 1

A biaxially stretched poly(ethylene terephthalate) resin film was obtained in the same manner as Comparative Example 9, except that the thickness of the sheet before stretching was 400 μm, the MD stretching ratio was 4 times, and the TD stretching ratio was 4 times. The film had a width of 40 cm and a length of 1000 m and was rolled around a paper tube. The physical properties of the film are shown in Table 3. As compared with Comparative Example 9, along with improvement of the in-plane orientation, the storage elastic modulus at 100° C. in the dynamic viscoelasticity of the obtained film was increased about double from 20 MPa to 50 MPa and the heat resistance was improved.

Comparative Example 10

After pellets of polypropylene resin (Noblen FS2011, produced by Sumitomo Chemical Co., Ltd.) and a powder of organically treated montmorillonite (CLOISITE™ 30B, produced by Southern Clay Products Inc.) as a layered compound were dry-blended at a weight ratio of 80/20 and supplied to two extruders and melted and mixed at 270° C. The obtained resin pellets were dried in a vacuum drier at 100° C. for 24 hours. The resin was supplied to an extruder and melted at 275° C. and the same kind of resin was laminated by a static mixer having 16 elements at 275° C. The laminate was extruded in a sheet-like form out of a T die heated at 275° C. to cooling rolls adjusted at 20° C. and then cooled and hardened to obtain an un-stretched multilayer sheet. The thickness of the un-stretched sheet was 150 μm, and the thickness of each layer in the center part in the width direction was about 1 μm. The sheet was at first preheated at 50° C., stretched 2 times by MD stretching by rolls with a surface temperature of 130° and a deformation speed of 3000%/min. Next, the sheet was continuously led to a tenter and stretched 2 times by TD stretching in a preheat zone at 160° C. and a stretching zone at 165° C., subjected to thermal fixation at 155° C. and 5% transverse relaxation treatment. Thereafter, the film was cooled, and both rim parts were cut and removed to obtain a biaxially stretched polypropylene resin film with a thickness of 25 μm. The film had a width of 40 cm and a length of 1000 m and was rolled around a paper tube. The physical properties of the film are shown in Table 4.

Reference Example 2

A biaxially stretched polypropylene resin film was obtained in the same manner as Comparative Example 10, except that the thickness of the sheet before stretching was made to be 1000 μm, the MD stretching ratio was 6 times, and the TD stretching ratio was 8 times. The film had a width of 40 cm and a length of 1000 m and was rolled around a paper tube.

The physical properties of the film are shown in Table 3. The in-plane orientation was sufficiently high and, for example, it was expected that the gas barrier property and heat resistance were improved.

Reference Example 3

After pellets of a MXD6 type polyamide resin containing montmorillonite as a layered compound evenly dispersed therein (IMPERM™ 105, produced by Nanocor, Inc., layered compound addition amount: 7%) were vacuum-dried overnight at 100° C., the pellets were supplied to an extruder and melted at 280° C. A static mixer with 16 elements heated at 280° C. was introduced in a melt-line, and the same kind of resin was laminated. The laminate was extruded in a sheet-like form out of a T die heated at 270° C. to cooling rolls adjusted at 20° C. and then cooled and hardened to produce an un-stretched multilayer sheet. The thickness of the un-stretched sheet was 200 μm, and the thickness of each layer in the center part in the width direction was about 1 μm. The sheet was at first preheated at 80° C. and stretched at a stretching temperature of 100° C. and a deformation speed of 5000%/min and ratio of 3.5 times. Next, the sheet was continuously led to a tenter and stretched 3.5 times by TD stretching in a preheat zone at 80° C. and a stretching zone at 95° C., subjected to thermal fixation at 180° C. and 3% transverse relaxation treatment. Thereafter, the film was cooled, and both rim parts were cut and removed to obtain a biaxially stretched polyamide resin film with a thickness of 15 μm. The film had a width of 40 cm and a length of 1000 m and was rolled around a paper tube. The physical properties of the film are shown in Table 3.

TABLE 3

| | | Examples | | | | | Reference Examples | | |
|---|---|---|---|---|---|---|---|---|---|
| | | 8 | 9 | 10 | 11 | 12 | 1 | 2 | 3 |
| Cast | Resin 1 | NF3040 | NF3040 | NF3040 | NF3040 | NF3040 + Cloisite | RE553 + Cloisite 10A | FS2011 + Cliisite | Imperm 105 |
| | Melting temperature (° C.) | 280 | 290 | 275 | 275 | 275 | 295 | 275 | 280 |
| | Resin 2 | NF3040 | NF3040 | NF3040 | NF3040 + T800 (50/50) | NF3040 + Cloisite | RE553 + Cloisite 10A | FS2011 + Cliisite | Imperm 105 |
| | Melting temperature (° C.) | 280 | 290 | 275 | 285 | 275 | 295 | 275 | 280 |
| | Layer ratio | 50/50 | 50/50 | 50/50 | 70/30 | 50/50 | 50/50 | 50/50 | 50/50 |
| | Laminate portion temperature (° C.) | 280 | 270/285 | 275 | 275 | 275 | 285 | 275 | 280 |
| | Adding amount of layerd compound (%) | 4 | 4 | 4 | 3.4 | 8 | 15 | 5 | 7 |
| | Content of inorganic material (%) | 2.6 | 2.6 | 2.6 | 2.2 | 5.2 | 15 | 3.2 | 5 |
| | Number of layers | 100 or more | 100 or more | 100 or more | 8 | 100 or more | 100 or more | 100 or more | 100 or more |
| MD streching | Preheating temperature (° C.) | 45 | 45 | 45 | 45 | 45 | 90 | 50 | 80 |
| | Streching temperature (° C.) | 80 | 80 | 80 | 80 | 85 | 110 | 135 | 100 |
| | Ratio (times) | 3.2 | 2.0, 2.0 | 3.2 | 3.2 | 3.2 | 4.0 | 6.0 | 3.5 |
| | Deformation speed (%/min) | 4500 | 1950, 1950 | 16000 | 4500 | 4500 | 5000 | 9000 | 5000 |
| TD streching | Preheating temperature (° C.) | 110 | 110 | 110 | 110 | 110 | 90 | 160 | 80 |
| | Streching temperature (° C.) | 135 | 130 | 130 | 135 | 130 | 100 | 165 | 95 |
| | Ratio (times) | 3.8 | 4.0 | 3.8 | 3.0 | 3.8 | 4.0 | 8.0 | 3.5 |
| Thermal fixation | Temperature (° C.) | 210 | 210 | 210 | 210 | 210 | 230 | 155 | 180 |
| Relaxation | Temperature (° C.) | 210 | 210 | 210 | 210 | 210 | 230 | 155 | 180 |
| | Relaxation ratio (%) | 5 | 5 | 5 | 5 | 5 | 5 | 5 | 3 |
| Properties | Thickness (μm) | 12 | 15 | 18 | 18 | 15 | 25 | 25 | 15 |
| | The in-plane orientation state of layered compound | ◯ | ◯ | ◯ | ◯ | ◯ | ◯ | ◯ | ◯ |
| | Haze (%) | 11 | 10 | 11 | 11 | 15 | 20 | 10 | 19 |
| | MD elastic modulus (GPa) | 2.7 | 2.7 | 2.9 | 2.5 | 2.8 | | | 3.8 |
| | Surface roughness (Sa) | 0.0124 | 0.0118 | 0.0140 | 0.0100 | 0.0800 | | | 0.062 |
| | Static friction coefficient μs | 0.78 | 0.78 | 0.81 | 0.77 | 0.83 | | | 0.54 |
| | The number of pinholes | 2 | 1 | 2 | 1 | 14 | | | 18 |
| | In-plane orientation of layered compound | 0.82 | 0.89 | 0.76 | 0.81 | 0.52 | 0.72 | 0.88 | 0.62 |
| | OTR (cc/m2/day/atm) | 12 | 10 | 12 | 12 | 7 | 25 | — | 1 |
| | High temperature MD elastic modulus (MPa) | 1.3 | 1.2 | 1.3 | 1.0 | 1.5 | 1.3 | — | 1.8 |
| | Measurement temperature (° C.) | 80 | 80 | 80 | 80 | 80 | 100 | — | 80 |

TABLE 4

|  |  | Comparative Examples | | | |
|---|---|---|---|---|---|
|  |  | 7 | 8 | 9 | 10 |
| Cast | Resin 1 | NF3040 | NF3040 | RE553 + Cloisite 10A | FS2011 + Cloisite 30B |
|  | Melting temperature (° C.) | 280 | 275 | 295 | 275 |
|  | Resin 2 | NF3040 | — | RE553 + Cloisite 10A | NF3040 + Cloisite 30B |
|  | Melting temperature (° C.) | 280 | — | 295 | 275 |
|  | Layer ratio | 50/50 | — | 50/50 | 50/50 |
|  | Laminate portion temperature (° C.) | 280 | 275 | 285 | 275 |
|  | Adding amount of layerd compound (%) | 4 | 4 | 15 | 5 |
|  | Content of inorganic material (%) | 2.6 | 2.6 | 15 | 3.3 |
|  | Number of layers | 100 or more | 1 | 100 or more | 100 or more |
| MD streching | Preheating temperature (° C.) | 40 | — | 90 | 50 |
|  | Streching temperature (° C.) | 60 | — | 110 | 130 |
|  | Ratio (times) | 2.0 | 2 | 2.0 | 2.0 |
|  | Deformation speed (%/min) | 4500 | — | 2500 | 3000 |
| TD streching | Preheating temperature (° C.) | 60 | — | 90 | 160 |
|  | Streching temperature (° C.) | 70 | — | 100 | 165 |
|  | Ratio (times) | 2.0 | 2 | 2.0 | 2.0 |
| Thermal fixation | Temperature (° C.) | 210 | — | 230 | 155 |
| Relaxation | Temperature (° C.) | 210 | — | 230 | 155 |
|  | Relaxation ratio (%) | 5 | — | 5 | 5 |
| Properties | Thickness (μm) | 30 | 20 | 25 | 25 |
|  | The in-plane orientation state of layered compound | x | x | x | x |
|  | Haze (%) | 13 | 8 | 30 | 17 |
|  | MD elastic modulus (GPa) | 1.2 | 0.8 |  |  |
|  | Surface roughness (Sa) | 0.03 | 0.005 |  |  |
|  | Static friction coefficient μs | 1.1 | 1.8 |  |  |
|  | The number of pinholes | 17 | 5 |  |  |
|  | In-plane orientation of layered compound | 0.2 | 0.1 or less | 0.2 | 0.2 |
|  | OTR (cc/m2/day/atm) | 17 | 20 | 44 | — |
|  | High temperature MD elastic modulus (M Pa) | 0.7 | 0.6 | 0.8 | — |
|  | Measurement temperature (° C.) | 80 | 80 | 100 | — |

(Attention) Since Cloisite 10A does not containe organic treatment agent, adding amount of layerd compound is equal to content of inorganic material

Example 13

After pellets of nylon 6 resin containing montmorillonite as a layered compound dispersed evenly therein (NF 3040, produced by Nanopolymer Composite Corp.; addition amount of the layered compound: 4% (inorganic material 2.6%)) were vacuum-dried overnight at 100° C., the pellets were supplied to two extruders and melted at 285° C. and the same resin was laminated by a static mixer having 10 elements heated at 285° C. The laminate was extruded in a sheet-like form out of a T die heated at 280° C. to cooling rolls adjusted at 20° C. and then cooled and hardened to obtain an un-stretched multilayer sheet. The ratio of the discharge amounts of the two extruders was controlled to be 1:1. The thickness of the un-stretched sheet was 240 μm, and the thickness of each layer in the center part in the width direction was about 1 μm. The Tg of the sheet was 35° C., and the melting point was 225° C. The sheet was at first preheated at 45° C., stretched 3.5 times by MD stretching at stretching temperature of 85° C. and a deformation speed of 4500%/min. Next, the sheet was continuously led to a tenter and stretched 3.8 times by TD stretching in a preheat zone at 65° C. and a stretching zone at 135° C., subjected to thermal fixation at 210° C. and 5% transverse relaxation treatment. Thereafter, the film was cooled, and both rim parts were cut and removed to obtain a biaxially stretched polyamide resin film with a thickness of 18 μm. The film had a width of 40 cm and a length of 1000 m and was rolled around a paper tube. The physical properties of the film are shown in Table 5.

Examples 14 to 18

The samples were produced under the conditions described in Table 5. In Examples 15, 17, and 18, TD stretching was carried out after two-step MD stretching. Each film had a width of 40 cm and a length of 1000 m and was rolled around a paper tube. The physical properties of the films are shown in Table 5.

Reference Example 4

After pellets of nylon 6 resin containing montmorillonite as a layered compound dispersed evenly therein (NF 3040, produced by Nanopolymer Composite Corp.; addition amount of the layered compound: 4% (inorganic material 2.6%)) and organically treated montmorillonite powder (CLOISITE™ 30B, produced by Southern Clay Products Inc.) were respectively vacuum-dried overnight at 100° C., they were dry-blended at a weight ratio of 92/8. Thereafter, the blended pellets were supplied to two extruders and melted and mixed at 285° C. The obtained resin pellets were again dried in a vacuum drier at 100° C. for 24 hours. The resin was supplied to an extruder and melted at 285° C. and the same kind of resin was laminated by a static mixer with 16 elements at 280° C. The laminate was extruded in a sheet-like form out of a T die heated at 270° C. to cooling rolls adjusted at 20° C. and then cooled and hardened to obtain an un-stretched multilayer sheet. The thickness of the un-stretched sheet was 180 μm, and the thickness of each layer in the center part in the width direction was about 1 μm. The Tg of the sheet was 35° C., and the melting point was 225° C. The sheet was at first preheated at 45° C., stretched 3.0 times by MD stretching by rolls with a surface temperature of 85° C. and a deformation speed of 2000%/min. Next, the sheet was continuously led to a tenter and stretched 3.8 times by TD stretching in a preheat zone at 110° C. and a stretching zone at 135° C., subjected to thermal fixation at 210° C. and 5% transverse relaxation treatment. Thereafter, the film was cooled, and both rim parts were cut and removed to obtain a biaxially stretched polyamide resin film with a thickness of 15 μm. The film had a width of 40 cm and a length of 1000 m and was rolled around a paper tube. The physical properties of the film are shown in Table 5.

Comparative Example 11

Pellets of nylon 6 resin containing montmorillonite as a layered compound dispersed evenly therein (NF 3040, produced by Nanopolymer Composite Corp.; addition amount of the layered compound: 4%) were vacuum-dried overnight at 100° C. Film formation was carried out using a monolayer inflation film formation apparatus. The pellets were supplied to an extruder and melted at 275° C. Next, the film was extruded out of a circular die heated at 275° C. and cooled with air. The discharge amount, rolling speed, and tube diameter were adjusted so as to control the stretching ratio of 2 times on the basis of the area. The center part of the tube was cut to obtain a biaxially stretched polyamide resin film with a thickness of 15 μm. The physical properties at that time are shown in Table 6.

Comparative Examples 12 to 14

The samples were produced under the conditions described in Table 6. In Examples 12 and 14, no static mixer was used and the films were made to be monolayer. Each film had a width of 40 cm and a length of 1000 m and was rolled around a paper tube. The physical properties of the films are shown in Table 6.

TABLE 5

| | | Examples | | | | | | Reference Example |
|---|---|---|---|---|---|---|---|---|
| | | 13 | 14 | 15 | 16 | 17 | 18 | 4 |
| Cast | Resin 1 | NF3040 | NF3040 + T800 (50/50) | NF3040 | NF3040 | NF3040 | NF3040 | NF3040 + Cloisite 30B |
| | Melting temperature (° C.) | 285 | 285 | 285 | 285 | 290 | 290 | 285 |
| | Resin 2 | NF3040 | NF3040 + T800 (50/50) | NF3040 | T814 | NF3040 | NF3040 | NF3040 + Cloisite 30B |
| | Melting temperature (° C.) | 285 | 285 | 285 | 270 | 290 | 290 | 285 |
| | Layer ratio | 50/50 | 50/50 | 50/50 | 25/75 | 45/55 | 50/50 | 50/50 |
| | Laminate portion temperature (° C.) | 285 | 285 | 275 | 270 | 275 | 280 | 280 |
| | Adding amount of layerd compound (%) | 4 | 2 | 4 | 1 | 4 | 4 | 12 |
| | Content of inorganic material (%) | 2.6 | 1.3 | 2.6 | 0.9 | 2.6 | 2.6 | 8 |
| | Number of layers | 100 or more | 100 or more | 100 or more | 100 or more | 100 or more | 100 or more | 100 or more |
| MD streching | Preheating temperature (° C.) | 45 | 65 | 45 | 60 | 45 | 45 | 45 |
| | Streching temperature (° C.) | 85 | 85 | 70 | 80 | 80 | 85 | 85 |
| | Ratio (times) | 3.5 | 2.5 | 2.0 × 2.0 | 3.5 | 1.5 × 1.8 | 2.0 × 2.2 | 3.0 |
| | Deformation speed (%/min) | 4500 | 16000 | 1950 + 1950 | 4500 | 1200 + 2700 | 1950 + 1950 | 2000 |
| | Ny(A)-Ny(B) | 0.003 | 0.006 | 0.003 | 0.006 | 0.003 | 0.003 | 0.003 |
| TD streching | Preheating temperature (° C.) | 65 | 110 | 110 | 70 | 110 | 110 | 110 |
| | Streching temperature (° C.) | 135 | 135 | 140 | 70 | 140 | 140 | 135 |
| | Ratio (times) | 3.8 | 3.8 | 4.0 | 3.8 | 4.0 | 4.0 | 3.8 |
| Thermal fixation | Temperature (° C.) | 210 | 210 | 210 | 210 | 210 | 210 | 210 |
| Relaxation | Temperature (° C.) | 210 | 210 | 210 | 210 | 210 | 210 | 210 |
| | Relaxation ratio (%) | 5 | 3 | 5 | 5 | 5 | 5 | 5 |
| Properties | Thickness (μm) | 18 | 13 | 12 | 15 | 12 | 8 | 15 |
| | The in-plane orientation state of layered compound | ○ | ○ | ○ | ○ | ○ | ○ | ○ |
| | Haze (%) | 11 | 5 | 13 | 3 | 10 | 16 | 17 |
| | MD elastic modulus (GPa) | 2.5 | 2.4 | 2.9 | 2.5 | 2.5 | 2.9 | 2.8 |
| | Surface roughness (Sa) | 0.0125 | 0.015 | 0.021 | 0.0300 | 0.018 | 0.0125 | 0.0800 |
| | Static friction coefficient μs | 0.73 | 0.93 | 0.65 | 0.44 | 0.72 | 0.74 | 0.75 |
| | The number of pinholes | 1 | 6 | 2 | 2 | 1 | 1 | 15 |
| | In-plane orientation of layered compound | 0.81 | 0.70 | 0.86 | 0.64 | 0.59 | 0.85 | 0.52 |
| | In-plane orientation (ΔP) | 0.060 | 0.059 | 0.065 | 0.065 | 0.057 | 0.063 | 0.057 |
| | Piercing strength/thickness (N/um) | 1.1 | 0.9 | 1.3 | 0.9 | 1.3 | 1.8 | 0.9 |

T800: Polyamide resin produced by Toyobo Co., Ltd.: RV = 2.5, containing no lubricant
T814: Polyamide resin produced by Toyobo Co., Ltd.: RV = 2.5, silica content 3500 ppm

TABLE 6

|  |  | Comparative Examples | | | |
|---|---|---|---|---|---|
|  |  | 11 | 12 | 13 | 14 |
| Cast | Resin 1 | NF3040 | T814 | NF3040 | NF3040 |
|  | Melting temperature (° C.) | 275 | 270 | 275 | 275 |
|  | Resin 2 | — | — | NF3040 | — |
|  | Melting temperature (° C.) | — | — | 275 | — |
|  | Layer ratio | — | — | 50/50 | — |
|  | Laminate portion temperature (° C.) | 275 | 270 | 270 | 270 |
|  | Adding amount of layerd compound (%) | 4 | 0 | 4 | 4 |
|  | Content of inorganic material (%) | 2.6 | 0.35 | 2.6 | 2.6 |
|  | Number of layers | 1 | 1 | 100 or more | 1 |
| MD streching | Preheating temperature (° C.) | — | 60 | 45 | 40 |
|  | Streching temperature (° C.) | — | 60 | 80 | 70 |
|  | Ratio (times) | 1.4 | 3.2 | 1.5 | 3 |
|  | Deformation speed (%/min) | — | 4500 | 1500 | 4500 |
|  | Ny(A)-Ny(B) | — | 0.007 | 0.001 | 0.000 |
| TD streching | Preheating temperature (° C.) | — | 60 | 110 | 55 |
|  | Streching temperature (° C.) | — | 70 | 130 | 70 |
|  | Ratio (times) | 1.4 | 3.8 | 2.0 | 2.5 |
| Thermal fixation | Temperature (° C.) | — | 210 | 210 | 210 |
| Relaxation | Temperature (° C.) | — | 210 | 210 | 210 |
|  | Relaxation ratio (%) | — | 5 | 5 | 3 |
| Properties | Thickness (μm) | 15 | 15 | 18 | 18 |
|  | The in-plane orientation state of layered compound | x | — | x | x |
|  | Haze (%) | 9 | 3 | 10 | 11 |
|  | MD elastic modulus (GPa) | 0.8 | 1.5 | 0.9 | 0.8 |
|  | Surface roughness (Sa) | 0.0050 | 0.1200 | 0.1500 | 0.0300 |
|  | Static friction coefficient μs | 1.8 | 0.8 | 1.1 | 1.2 |
|  | The number of pinholes | 5 | 2 | 25 | 14 |
|  | In-plane orientation of layered compound | 0.1 or less | — | 0.1 or less | 0.33 |
|  | In-plane orientation (ΔP) | 0.003 | 0.06 | 0.055 | 0.056 |
|  | Piercing strength/thickness (N/μm) | 0.5 | 0.7 | 0.6 | 0.65 |

Example 19

After pellets of nylon 6 resin containing montmorillonite as a layered compound dispersed evenly therein (NF 3040, produced by Nanopolymer Composite Corp.; addition amount of the layered compound: 4%) were vacuum-dried overnight at 100° C., the same resin was supplied to two extruders and melted at 280° C. and laminated by a static mixer with 16 elements at 280° C. The laminate was extruded in a sheet-like form out of a T die heated at 275° C. to cooling rolls adjusted at 20° C. and then cooled and hardened to obtain an un-stretched multilayer sheet. The ratio of the discharge amounts of the two extruders was controlled to be 1:1. The thickness of the un-stretched sheet was 180 μm, the thickness of each layer was about 1 μm in the cross section, and the number of the layers was 100 or more. The Tg of the sheet was 35° C., and the melting point was 225° C. The sheet was at first preheated at 45° C., stretched 3.2 times by lengthwise stretching at a stretching temperature of 85° C. and a deformation speed of 4500%/min. Next, the sheet was continuously led to a tenter and stretched 3.8 times by transverse stretching in a preheat zone at 110° C. and a stretching zone at 130° C., subjected to thermal fixation at 210° C. and 5% transverse relaxation treatment. Thereafter, the film was cooled, and the un-stretched part in the width direction was cut and removed to obtain a biaxially stretched polyamide resin film with a thickness of 18 μm. The film had a width of 40 cm and a length of 1000 m and was rolled around a paper tube. The physical properties of the film are shown in Table 7.

Examples 20 and 21 and Comparative Examples 16 to 18

The samples were produced in the same manner as Example 19 under the conditions described in Table 7. The film properties are shown in Table 7. In Example 21, a multilayer sheet was produced by using a static mixer with 6 elements. In Comparative Example 18, a sample was produced from a monolayer sheet by using a feed block with a monolayer structure.

Comparative Example 15

Pellets of nylon 6 resin containing montmorillonite as a layered compound dispersed evenly therein (NF 3040, produced by Nanopolymer Composite Corp.; addition amount of the layered compound: 4%) were vacuum-dried overnight at 100° C. Film formation was carried out using a monolayer inflation film formation apparatus. The pellets were supplied to an extruder and melted at 290° C. Next, the film was extruded out of a circular die heated at 280° C. and cooled with air and simultaneously, the discharge amount, rolling speed, and tube diameter were adjusted so as to control the stretching ratio of 4 times on the basis of the area. The center part of the tube was cut to obtain a biaxially stretched polyamide resin film with a thickness of 15 μm. The film had a width of 40 cm and a length of 1000 m and was rolled around a paper tube. The physical properties at that time are shown in Table 7.

TABLE 7

|  |  | Examples | | | Comparative Examples | | | |
| --- | --- | --- | --- | --- | --- | --- | --- | --- |
|  |  | 19 | 20 | 21 | 15 | 16 | 17 | 18 |
| Cast | Resin 1 | NF3040 | NF3040 | NF3040 | NF3040 | T814 | NF3040 + T814 (50/50) | NF3040 + T814 (12.5/87.5) |
|  | Melting temperature (° C.) | 280 | 285 | 285 | 290 | 270 | 280 | 280 |
|  | Resin 2 | NF3040 | NF3040 | NF3040 | — | T814 | NF3040 + T814 (50/50) | NF3040 + T814 (12.5/87.5) |
|  | Melting temperature (° C.) | 280 | 285 | 285 | — | 270 | 280 | 280 |
|  | Layer ratio | 50/50 | 50/50 | 50/50 | — | 50/50 | 50/50 | 50/50 |
|  | Laminate portion temperature (° C.) | 280 | 280 | 280 | 280 | 270 | 270 | 270 |
|  | Adding amount of layerd compound (%) | 4 | 4 | 4 | 4 | 0 | 2 | 0.5 |
|  | Content of inorganic material (%) | 2.6 | 2.6 | 2.6 | 2.6 | 0.35 | 1.5 | 0.6 |
|  | Number of layers | 100 or more | 100 or more | 60 | 1 | 100 or more | 100 or more | 1 |
| MD streching | Preheating temperature (° C.) | 45 | 45 | 40 | — | 60 | 60 | 45 |
|  | Streching temperature (° C.) | 85 | 80 | 80 | — | 60 | 60 | 60 |
|  | Ratio (times) | 3.2 | 3.2 | 3.2 | 2 | 3.0 | 2.0 | 3.0 |
|  | Deformation speed (%/min) | 4500 | 4500 | 4500 | — | 4300 | 4300 | 4500 |
|  | Ny(A)-Ny(B) | 0.003 | 0.003 | 0.003 | — | 0.008 | 0.003 | 0.003 |
| TD streching | Preheating temperature (° C.) | 110 | 110 | 80 | — | 110 | 110 | 60 |
|  | Streching temperature (° C.) | 130 | 135 | 100 | — | 130 | 130 | 110 |
|  | Ratio (times) | 3.8 | 3.8 | 3.5 | 2 | 4.0 | 2.5 | 4.0 |
| Thermal fixation | Temperature (° C.) | 210 | 210 | 210 | — | 210 | 210 | 210 |
| Relaxation | Temperature (° C.) | 210 | 210 | 210 | — | 210 | 210 | 210 |
|  | Relaxation ratio (%) | 5 | 5 | 5 | — | 3 | 3 | 5 |
| Properties | Thickness (μm) | 18 | 20 | 15 | 15 | 15 | 18 | 19 |
|  | The in-plane orientation state of layered compound | ○ | ○ | ○ | X | — | X | ○ |
|  | Haze (%) | 12.1 | 12.0 | 8.2 | 5.2 | 1.8 | 8 | 23 |
|  | MD elastic modulus (GPa) | 2.5 | 2.5 | 2.5 | 0.8 | 1.5 | 2.4 | 1.5 |
|  | Surface roughness (Sa) | 0.0140 | 0.0130 | 0.0130 | 0.0050 | 0.1200 | 0.0210 | 0.1300 |
|  | Static friction coefficient μs | 0.68 | 0.65 | 0.66 | 1.8 | 0.8 | 0.93 | 0.79 |
|  | The number of pinholes | 2 | 2 | 4 | 5 | 2 | 6 | 1 |
|  | In-plane orientation of layered compound | 0.81 | 0.82 | 0.49 | 0.1 or less | — | 0.7 | 0.64 |
|  | Equilibrium moisture content (%) | 3.3 | 3.5 | 4.5 | 5.0 | 2.6 | 3.8 | 2.9 |
|  | Maximum point stress × Elongation at 40% RH (X1, MPa* %) | 18595 | 20765 | 27294 | 13724 | 13546 | 13565 | 15543 |
|  | Maximum point stress × Elongation at 80% RH (X2, MPa* %) | 19686 | 23601 | 35209 | 22233 | 32230 | 26451 | 35594 |
|  | X2/X1 | 1.06 | 1.14 | 1.29 | 1.62 | 2.38 | 1.95 | 2.29 |
|  | In-plane orientation (ΔP) | 0.0060 | 0.0061 | 0.0062 | 0.003 | 0.0061 | 0.0055 | 0.0059 |

T814: Polyamide resin produced by Toyobo Co., Ltd.: RV = 2.5, silica content 3500 ppm Next, the second invention will be described with reference to Examples and Comparative Examples.

Example 22

After pellets of nylon 6 resin (T-814, produced by Toyobo Co., Ltd.: relative viscosity RV=2.8, containing a lubricant) were vacuum-dried overnight at 100° C., the same resin pellets were supplied to two extruders and melted at 270° C. and the same kind of resin was laminated by a static mixer having 10 elements. The laminate was extruded in a sheet-like form out of a T die to cooling rolls adjusted at 20° C. and then cooled and hardened to obtain an un-stretched multilayer sheet. The ratio of the discharge amounts of the two extruders was controlled to be 1:1. The thickness of the un-stretched sheet was 250 μm, and the thickness of each layer measured in a cross section was about 1 μm. The Tg of the sheet was 35° C., and the melting point was 225° C. The sheet was at first preheated at 40° C., stretched 3.2 times by lengthwise stretching at a stretching temperature of 60° C. Next, the sheet was continuously led to a tenter and stretched 3.8 times by transverse stretching at a preheating temperature of 60° C. and a stretching temperature of 130° C. and subjected to thermal fixation at 210° C. and 5% transverse relaxation treatment. Thereafter, the film was cooled, and both rim parts were cut and removed to obtain a biaxially stretched polyamide resin film with a thickness of 14 μm. The film had a width of 40 cm and a length of 1000 m and was rolled around a paper tube. The physical properties at that time are shown in Table 8.

Examples 23 to 31 and Comparative Examples 19 to 26

In Examples 24 and 25, un-stretched sheets with an 8-layer structure were produced by using a feed block with an 8-layer structure. In Comparative Examples 19 to 20, 23, and 25 to 26, un-stretched sheets with a monolayer structure were produced by using a feed block with a monolayer structure. In Comparative Example 21, an un-stretched sheet with a 16-layer structure was produced. In Examples 23, 24, 25, 26, and 27 and Comparative Example 23, samples were produced under the conditions described in Table 8 and in the same manner as Example 22, except TD stretching was carried out after two-step MD stretching. The film properties are shown in Table 8 for Examples 23 and 24, in Table 9 for Examples 25 to 31, in Table 8 for Comparative Examples 19 to 23, and in Table 10 for Comparative Examples 24 to 26.

Comparative Example 27

Pellets of nylon 6 resin containing montmorillonite as a layered compound dispersed evenly therein (NF 3040, produced by Nanopolymer Composite Corp.; addition amount of the layered compound: 4%) were vacuum-dried overnight at 100° C. Film formation was carried out using a monolayer inflation film formation apparatus. The pellets were supplied to an extruder and melted at 280° C. Next, the film was extruded out of a circular die heated at 280° C. and cooled with air and simultaneously, the discharge amount, rolling speed, and tube diameter were adjusted so as to control the stretching ratio of 4 times on the basis of the area. The center part of the tube was cut to obtain a biaxially stretched polyamide resin film with a thickness of 25 μm. The physical properties at that time are shown in Table 10.

Example 32

Pellets of nylon 6 resin (T-814, produced by Toyobo Co., Ltd.: relative viscosity RV=28, containing a lubricant), pellets of nylon 6 resin containing montmorillonite as a layered compound dispersed evenly therein (NF 3040, produced by Nanopolymer Composite Corp.; addition amount of the layered compound: 4%), and pellets of MXD6 type nylon resin copolymerized with m-xylylenediamine and excellent in the barrier property were vacuum-dried overnight at 100° C. A static mixer with 16 elements heated at 275° C. was introduced into a melt line between an extruder at the skin layer side and a feed block of a film formation apparatus capable of laminating two-kind three-layers, the pellets of T814 and NF3040 blended by dry blend at a ratio of 50/50 were supplied to two extruders at the skin layer side and S6001 was supplied to an extruder at the core layer side. The resins at the skin layer side were melted at 270° C., the resin at the core layer side was melted at 280° C., and a structure (multilayer structure) in which a monolayer sheet was sandwiched by two sheets with multilayer structure was formed by a feed block heated at 275° C. The resulting laminate was extruded in a sheet-like form out of a T die to cooling rolls adjusted at 20° C. and then cooled and hardened to obtain an un-stretched multilayer sheet. The ratio of the discharge amounts of the three extruders was controlled to be 45:10:45. The thickness of the un-stretched sheet was 250 μm, and the thickness of each layer at the skin layer side measured in a cross section was about 1 μm. The sheet was at first preheated at 70° C., stretched 3.2 times by lengthwise stretching at a stretching temperature of 80° C. and a deformation speed of 4500%/min. Next, the sheet was continuously led to a tenter and stretched 3.8 times by transverse stretching at a preheating 110° C. and thereafter at 135° C. and subjected to thermal fixation at 210° C. and 5% transverse relaxation treatment. Thereafter, the film was cooled, and both rim parts were cut and removed to obtain a biaxially stretched polyamide resin film with a thickness of 15 μm. The film had a width of 40 cm and a length of 1000 m and was rolled around a paper tube. The physical properties at that time are shown in Table 10.

TABLE 8

|  |  | Examples | | | Comparative Examples | | | | |
|---|---|---|---|---|---|---|---|---|---|
|  |  | 22 | 23 | 24 | 19 | 20 | 21 | 22 | 23 |
| Cast | Resin 1 | T814 | T814 | T814 | T814 | T814 | T814 | T814 | T814 |
|  | Melting temperature (° C.) | 270 | 270 | 270 | 270 | 270 | 270 | 270 | 270 |
|  | Resin 2 | T814 | T814 | S6001 | — | — | — | NF3040 | — |
|  | Melting temperature (° C.) | 270 | 270 | 285 | — | — | — | 275 | — |
|  | Layer ratio | 50/50 | 50/50 | 90/10 | — | — | — | 75/25 | — |
|  | Laminate portion temperature (° C.) | 270 | 270 | 270 | 270 | 270 | 270 | 270 | 270 |
|  | Adding amount of layerd compound (%) | 0 | 0 | 0 | 0 | 0 | 0 | 1 | 0 |
|  | Content of inorganic material (%) | 0.35 | 0.35 | 0.32 | 0.35 | 0.35 | 0.35 | 1.35 | 0.35 |
|  | Number of layers | 100 or more | 100 or more | 8 | 1 | 1 | 16 | 100 or more | 1 |
| MD streching | Preheating temperature (° C.) | 40 | 45 | 45 | 40 | 40 | 40 | 40 | 45 |
|  | Streching temperature (° C.) | 60 | 60 | 60 | 60 | 60 | 80 | 70 | 60 |
|  | Ratio (times) | 3.2 | 2.0, 2.0 | 2.0, 2.0 | 2 | 5.5 | 2 | 3 | 1.75, 1.75 |
|  | Deformation speed (%/min) | 9000 | 4500, 4500 | 4500, 4500 | 4500 | 4500 | 4500 | 4500 | 1900, 1900 |
|  | Ny(A)-Ny(B) | 0.0065 | 0.0062 | 0.0062 | 0.006 | 0.008 | 0.004 | 0.006 | 0.004 |
| TD streching | Preheating temperature (° C.) | 60 | 60 | 60 | 60 | 60 | 60 | 60 | 60 |
|  | Streching temperature (° C.) | 130 | 130 | 130 | 130 | 130 | 130 | 130 | 130 |
|  | Ratio (times) | 8.8 | 4 | 4 | 2 | 2.5 | 5 | 3.5 | 4 |
| Thermal fixation | Temperature (° C.) | 210 | 210 | 210 | 210 | 210 | 210 | 210 | 210 |
| Relaxation | Temperature (° C.) | 210 | 210 | 210 | 210 | 210 | 210 | 210 | 210 |
|  | Relaxation ratio (%) | 5 | 3 | 5 | 5 | 5 | 5 | 5 | 5 |
| Properties | Thickness (μm) | 14 | 15 | 15 | 18 | 16 | 15 | 15 | 14 |
|  | The in-plane orientation state of layered compound | — | — | — | — | — | — | ◯ | — |
|  | Haze (%) | 3 | 3 | 3.1 | 3 | 3 | 4 | 5 | 2 |
|  | MD elastic modulus (GPa) | 1.5 | 1.6 | 1.8 | 1.2 | 1.3 | 1.5 | 1.9 | 1.4 |
|  | Surface roughness (Sa) | 0.12 | 0.10 | 0.10 | 0.11 | 0.12 | 0.12 | 0.09 | 0.12 |
|  | Static friction coefficient μs | 0.8 | 0.9 | 1.1 | 0.8 | 0.7 | 0.8 | 0.75 | 0.8 |
|  | The number of pinholes | 2 | 1 | 4 | 1 | 2 | 2 | 2 | 2 |
|  | In-plane orientation of layered compound | — | — | — | — | — | — | 0.52 | — |
|  | In-plane orientation (ΔP) | 0.063 | 0.064 | 0.062 | 0.04 | 0.06 | 0.051 | 0.062 | 0.063 |
|  | Boiling strain (%) | 0.7 | 0.4 | 0.9 | 0.4 | 2.8 | 2.5 | 2.9 | 2.2 |

TABLE 8-continued

|  | | Examples | | | Comparative Examples | | | | |
|---|---|---|---|---|---|---|---|---|---|
|  | | 22 | 23 | 24 | 19 | 20 | 21 | 22 | 23 |
| Heat shrinkage ratio (%) | | 1.2 | 1.3 | 1.2 | 1.5 | 1.6 | 1.9 | 1.0 | 2 |
| OTR(cc/m²/day/atm) | | 22 | 22 | 12 | 22 | 22 | 22 | 18 | 22 |

T800: Polyamide resin produced by Toyobo Co., Ltd.: RV = 2.5, containing no lubricant
T814: Polyamide resin produced by Toyobo Co., Ltd.: RV = 2.5, silica content 3500 ppm

TABLE 9

|  |  | Examples | | | | | | |
|---|---|---|---|---|---|---|---|---|
|  |  | 25 | 26 | 27 | 28 | 29 | 30 | 31 |
| Cast | Resin 1 | NF3040 | NF3040 | NF3040 | NF3040 | NF3040 | NF3040 + T814 (50/50) | NF3040 |
|  | Melting temperature (° C.) | 280 | 280 | 280 | 280 | 280 | 280 | 280 |
|  | Resin 2 | NF3040 | NF3040 | NF3040 | NF3040 | NF3040 | NF3040 + T814 (50/50) | NF3040 |
|  | Melting temperature (° C.) | 280 | 280 | 280 | 280 | 280 | 280 | 280 |
|  | Layer ratio | 50/50 | 55/45 | 50/50 | 50/50 | 50/50 | 50/50 | 50/50 |
|  | Laminate portion temperature (° C.) | 285 | 280 | 285 | 300 | 310 | 290 | 310 |
|  | Adding amount of layerd compound (%) | 4 | 4 | 4 | 4 | 4 | 2 | 4 |
|  | Content of inorganic material (%) | 2.6 | 2.6 | 2.6 | 2.6 | 2.6 | 1.5 | 2.6 |
|  | Number of layers | 8 | 100 or more | 100 or more | 100 or more | 100 or more | 100 or more | 100 or more |
| MD streching | Preheating temperature (° C.) | 45 | 45 | 45 | 45 | 45 | 45 | 45 |
|  | Streching temperature (° C.) | 80 | 80 | 80 | 85 | 85 | 80 | 80 |
|  | Ratio (times) | 2.0 × 2.0 | 1.5 × 2.3 | 2.3 × 1.5 | 3.2 | 3.2 | 3.2 | 2.0 × 2.0 |
|  | Deformation speed (%/min) | 1950 + 1950 | 1200 + 2700 | 2700 + 1200 | 4500 | 4500 | 4500 | 1950 + 1950 |
|  | Ny(A)-Ny(B) | 0.004 | 0.002 | 0.004 | 0.003 | 0.003 | 0.003 | 0.003 |
| TD streching | Preheating temperature (° C.) | 110 | 110 | 110 | 110 | 110 | 100 | 110 |
|  | Streching temperature (° C.) | 135 | 135 | 135 | 130 | 130 | 125 | 130 |
|  | Ratio (times) | 3 | 4 | 4 | 3.8 | 3.8 | 3.8 | 4.5 |
| Thermal fixation | Temperature (° C.) | 210 | 210 | 210 | 215 | 210 | 210 | 210 |
| Relaxation | Temperature (° C.) | 210 | 210 | 210 | 210 | 210 | 210 | 210 |
|  | Relaxation ratio (%) | 5 | 5 | 5 | 5 | 5 | 5 | 3 |
| Properties | Thickness (μm) | 15 | 13 | 14 | 18 | 18 | 15 | 14 |
|  | The in-plane orientation state of layered compound | ○ | ○ | ○ | ○ | ○ | ○ | ○ |
|  | Haze (%) | 10 | 10 | 11 | 14 | 14 | 8 | 6.5 |
|  | In-plane orientation (ΔP) | 0.059 | 0.061 | 0.064 | 0.061 | 0.06 | 0.065 | 0.064 |
|  | MD elastic modulus (GPa) | 2.4 | 1.9 | 1.9 | 2.5 | 2.5 | 2 | 2.7 |
|  | Surface roughness (Sa) | 0.025 | 0.024 | 0.024 | 0.0128 | 0.0128 | 0.015 | 0.015 |
|  | Static friction coefficient μs | 0.82 | 0.8 | 0.8 | 0.79 | 0.79 | 0.94 | 0.8 |
|  | The number of pinholes | 2 | 1 | 1 | 3 | 3 | 6 | 1 |
|  | In-plane orientation of layered compound | 0.55 | 0.81 | 0.84 | 0.8 | 0.82 | 0.74 | 0.88 |
|  | Boiling strain (%) | 0.9 | 0.7 | 1.3 | 1.7 | 1.4 | 0.9 | 0.6 |
|  | Heat shrinkage ratio (%) | 1.3 | 1.2 | 0.9 | 0.1 | 0.2 | 0.8 | 0.3 |
|  | OTR(cc/m²/day/atm) | 11 | 12 | 10 | 11 | 10.5 | 14.5 | 14 |

TABLE 10

|  |  | Comparative Examples | | | | Example |
|---|---|---|---|---|---|---|
|  |  | 24 | 25 | 26 | 27 | 32 |
| Cast | Resin 1 (skin layer side) | NF3040 | NF3040 | NF3040 + T814 (50/50) | NF3040 | NF3040 + T814 (50/50) |
|  | Melting temperature (° C.) | 280 | 280 | 280 | 280 | 270 |
|  | Resin 2 (skin layer side) | NF3040 | — | — | — | NF3040 + T814 (50/50) |
|  | Melting temperature (° C.) | 260 | — | — | — | 270 |
|  | Resin 3 (core layer side) | — | — | — | — | S6001 |
|  | Melting temperature (° C.) | — | — | — | — | 280 |
|  | Layer ratio | 50/0/50 | — | — | — | 45/10/45 |
|  | Laminate portion temperature of resin 1 and resin 2 (° C.) | 285 | 280 | 285 | 280 | 275 |
|  | Laminate portion temperature of resins 1-3 (° C.) | — | — | — | — | 275 |

TABLE 10-continued

|  |  | Comparative Examples |  |  |  | Example |
|---|---|---|---|---|---|---|
|  |  | 24 | 25 | 26 | 27 | 32 |
|  | Adding amount of layerd compound (%) | 4 | 4 | 2 | 4 | 1.8 |
|  | Content of inorganic material (%) | 2.6 | 2.6 | 1.5 | 2.6 | 1.3 |
|  | Number of layers | 100 or more | 1 | 1 | 1 | 100 or more |
| MD streching | Preheating temperature (° C.) | 45 | 45 | 45 | — | 70 |
|  | Streching temperature (° C.) | 85 | 85 | 80 | — | 80 |
|  | Ratio (times) | 4 | 3 | 3 | 2 | 3.2 |
|  | Deformation speed (%/min) | 4800 | 4500 | 500 | — | 4500 |
|  | Ny(A)-Ny(B) | 0.001 | 0.000 | 0.000 | — | 0.003 |
| TD streching | Preheating temperature (° C.) | 110 | 110 | 110 | — | 110 |
|  | Streching temperature (° C.) | 135 | 135 | 135 | — | 135 |
|  | Ratio (times) | 2 | 2 | 3.5 | 2 | 3.8 |
| Thermal fixation | Temperature (° C.) | 210 | 210 | 210 | — | 210 |
| Relaxation | Temperature (° C.) | 210 | 210 | 210 | — | 210 |
|  | Relaxation ratio (%) | 5 | 5 | 5 | — | 5 |
| Properties | Thickness (μm) | 18 | 20 | 18 | 25 | 15 |
|  | The in-plane orientation state of layered compound | X | X | ○ | X |  |
|  | Haze (%) | 10 | 25 | 40 | 3 | 7 |
|  | MD elastic modulus (GPa) | 0.9 | 0.9 | 2.2 | 0.7 | 2.6 |
|  | Surface roughness (Sa) | 0.15 | 0.14 | 0.014 | 0.005 | 0.18 |
|  | Static friction coefficient μs | 1.1 | 1.12 | 0.78 | 1.8 | 0.45 |
|  | The number of pinholes | 25 | 35 | 14 | 5 | 2 |
|  | In-plane orientation of layered compound | 0.2 | 0.1 | 0.45 | 0.1 or less | 0.66 |
|  | In-plane orientation (ΔP) | 0.0062 | 0.055 | 0.056 | 0.056 | 0.006 |
|  | Boiling strain (%) | 3.4 | 2.2 | 3.4 | 2 | 1.6 |
|  | Heat shrinkage ratio (%) | 2.1 | 2.5 | 3.3 | 1.0 | 1.0 |
|  | OTR(cc/m$^2$/day/atm) | 30 | 15 | 25 | 2.0 | 10 |

INDUSTRIAL APPLICABILITY

A conventional nylon film is made easy to slip by roughing the surface in the case the slipping property under high humidity is required because the slipping property fluctuates in accordance with the humidity. However, according to the first invention, since a film containing an inorganic layered compound has little effect on the slipping property relative to the humidity level and sufficient slipping is observed even if the surface roughness is small, contradictory characteristics such as slip and gloss can be simultaneously satisfied. The layered compound is in-plane orientated to a high level, so that the effect of improving various characteristics can be extracted to the ultimate extent, such that the film is excellent in appearance, has high productivity, and high industrial value. Further, the obtained film has an excellent oxygen barrier property, dimensional stability, mechanical characteristics, and piercing strength. Thus, it is possible to produce a film having improved mechanical characteristics in low humidity and lowered humidity dependence of the impact strength at a low speed with a high productivity, so that the film can be used in applications, for which conventional films were previously difficult to use. Thus, the films described herein are useful as industrial materials other than wrapping materials for food, drug, and general goods.

Further, a conventional biaxially stretched polyamide resin film shows significant boiling strain due to bowing of the film if the in-plane orientation is increased for improving the mechanical characteristics. In the case of the biaxially stretched multilayer polyamide resin film of the second invention, the boiling strain in the end parts in the film width direction is diminished by lowering the stretching stress, and productivity of films with low boiling strain can be improved.

Furthermore, addition of the layered compound to each layer makes it possible to produce a film excellent in not only the boiling strain but also the mechanical characteristics and the barrier property.

The invention claimed is:

1. A biaxially stretched polyamide resin film containing 0.3 to 10 wt. % of an inorganic material including a layered compound and having a laminate structure of 8 or more layers in total, wherein the layered compound is in-plane oriented and the film has a haze of 1.0 to 20%, an elastic modulus in the longitudinal direction of 1.7 to 3.5 GPa at a relative humidity of 35% RH, a surface roughness (Sa) of 0.01 to 0.1 μm, and a static friction coefficient (F/B) of 0.3 to 1.0 at a normal stress of 0.5 N/cm$^2$.

2. The biaxially stretched polyamide resin film as described in claim 1, wherein the number of pinholes after 1000 times Gelbo Flex test at 23° C. is 0 to 30.

3. The biaxially stretched polyamide resin film as described in claim 2, wherein the film is transversely stretched at a transverse stretching temperature of 50 to 155° C.

4. The biaxially stretched polyamide resin film as described in claim 1, wherein the film is transversely stretched at a transverse stretching temperature of 50 to 155° C.

5. The biaxially stretched polyamide resin film as described in claim 1, wherein the film has a thickness of 3 to 200 μm, and the in-plane orientation degree of the inorganic layered compound measured by x-ray diffractometry is in a range of 0.4 to 1.0.

6. The biaxially stretched polyamide multilayer resin film as described in claim 5, wherein a static mixer method is employed at the time of melt extrusion of a thermoplastic resin and the resin temperature immediately before introduction into the static mixer is in a range from the melting point to melting point +70° C. and the heater temperature in the latter half of the static mixer is set to be higher by 5° C. or more and by 40° C. or less than the resin temperature immediately before introduction into the static mixer.

7. The biaxially stretched polyamide resin film as described in claim 1, wherein the layered compound is in-plane oriented and the in-plane orientation (ΔP) of the film is 0.057 to 0.075, and the value of piercing strength/thickness of the film is 0.88 to 2.50 (N/μm).

8. The biaxially stretched polyamide resin film as described in claim 7, wherein the stretching ratio on the basis of an area by biaxial stretching measured as the product of the stretching ratio in the lengthwise direction and the stretching ratio in the transverse direction is 8.5 times or more.

9. The biaxially stretched polyamide resin film as described in claim 8, wherein biaxial stretching is successive biaxial stretching in lengthwise stretching-transverse stretching order and when Ny is defined as a refractive index in the center part in the width direction of the film, the difference Ny(A)−Ny(B) between Ny(A) which is Ny of the sheet before lengthwise stretching and Ny(B) which is Ny of the sheet after uniaxial stretching is 0.003 or higher.

10. The biaxially stretched polyamide resin film as described in claim 7, wherein biaxial stretching is successive biaxial stretching in lengthwise stretching-transverse stretching order and when Ny is defined as a refractive index in the center part in the width direction of the film, the difference Ny(A)−Ny(B) between Ny(A) which is Ny of the sheet before lengthwise stretching and Ny(B) which is Ny of the sheet after uniaxial stretching is 0.003 or higher.

11. The biaxially stretched polyamide resin film as described in claim 1, wherein the film is obtained by stretching as much as 2.5 to 5.0 times in the longitudinal direction and 3.0 to 5.0 times in the width direction, and the film has a ratio of the product (X1) of the maximum point stress (MPa) and a breaking elongation (%) of a sample stored at a humidity of 40% for 12 hours and the product (X2) of the maximum point stress (MPa) and a breaking elongation (%) of a sample stored at a relative humidity of 80% for 12 hours is in a range of 1.0 to 1.5 when the maximum point stress and breaking elongation is measured by a method as described in JIS K 7113 under conditions of a starting length of 40 mm, a width of 10 mm, and a deformation rate of 200 mm/min after storage at an equilibrium water absorption ratio of 3.0 to 7.0% and a relative humidity of 40%.

\* \* \* \* \*